US011657799B2

(12) United States Patent
Zhao et al.

(10) Patent No.: US 11,657,799 B2
(45) Date of Patent: May 23, 2023

(54) PRE-TRAINING WITH ALIGNMENTS FOR RECURRENT NEURAL NETWORK TRANSDUCER BASED END-TO-END SPEECH RECOGNITION

(71) Applicant: Microsoft Technology Licensing, LLC, Redmond, WA (US)

(72) Inventors: Rui Zhao, Bellevue, WA (US); Jinyu Li, Redmond, WA (US); Liang Lu, Redmond, WA (US); Yifan Gong, Sammamish, WA (US); Hu Hu, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 405 days.

(21) Appl. No.: 16/840,311

(22) Filed: Apr. 3, 2020

(65) Prior Publication Data
US 2021/0312905 A1 Oct. 7, 2021

(51) Int. Cl.
*G10L 15/22* (2006.01)
*G10L 15/26* (2006.01)
(Continued)

(52) U.S. Cl.
CPC .......... *G10L 15/063* (2013.01); *G06N 3/0445* (2013.01); *G06N 3/08* (2013.01)

(58) Field of Classification Search
CPC ..... G10L 15/16; G10L 15/063; G06N 3/0445; G06N 3/0454; G06N 3/04; G06N 3/08
See application file for complete search history.

(56) References Cited

U.S. PATENT DOCUMENTS 8,494,850 B2 * 7/2013 Chelba .................. G10L 15/063
704/254
9,972,339 B1 * 5/2018 Sundaram ............... G10L 25/30
(Continued)

OTHER PUBLICATIONS

S. Wang, P. Zhou, W. Chen, J. Jia and L. Xie, "Exploring RNN-Transducer for Chinese speech recognition," 2019 Asia-Pacific Signal and Information Processing Association Annual Summit and Conference (APSIPA ASC), 2019, pp. 1364-1369, doi: 10.1109/APSIPAASC47483.2019.9023133. (Year: 2019).*
(Continued)

*Primary Examiner* — Seong-Ah A Shin
(74) *Attorney, Agent, or Firm* — NovoTechIP International PLLC

(57) ABSTRACT

Techniques performed by a data processing system for training a Recurrent Neural Network Transducer (RNN-T) herein include encoder pretraining by training a neural network-based token classification model using first token-aligned training data representing a plurality of utterances, where each utterance is associated with a plurality of frames of audio data and tokens representing each utterance are aligned with frame boundaries of the plurality of audio frames; obtaining first cross-entropy (CE) criterion from the token classification model, wherein the CE criterion represent a divergence between expected outputs and reference outputs of the model; pretraining an encoder of an RNN-T based on the first CE criterion; and training the RNN-T with second training data after pretraining the encoder of the RNN-T. These techniques also include whole-network pretraining of the RNN-T. A RNN-T pretrained using these techniques may be used to process audio data that includes spoken content to obtain a textual representation.

17 Claims, 14 Drawing Sheets

(51) Int. Cl.
G10L 15/16 (2006.01)
G10L 15/06 (2013.01)
G06N 3/04 (2023.01)
G06N 3/08 (2023.01)

(56) References Cited

U.S. PATENT DOCUMENTS

| | | | | |
|---|---|---|---|---|
| 10,706,840 | B2* | 7/2020 | Sak | G10L 15/14 |
| 11,087,739 | B1* | 8/2021 | Rastrow | G06F 40/216 |
| 2017/0372200 | A1* | 12/2017 | Chen | G10L 15/22 |
| 2019/0122101 | A1* | 4/2019 | Lei | G06N 3/0445 |
| 2019/0333500 | A1* | 10/2019 | Kim | G06F 40/284 |
| 2020/0035222 | A1* | 1/2020 | Sypniewski | G10L 15/063 |
| 2020/0126538 | A1* | 4/2020 | Han | G10L 15/063 |
| 2020/0327884 | A1* | 10/2020 | Bui | G10L 15/075 |
| 2020/0349922 | A1* | 11/2020 | Peyser | G06F 40/279 |
| 2021/0012769 | A1* | 1/2021 | Vasconcelos | G10L 15/30 |
| 2021/0233512 | A1* | 7/2021 | Peyser | G10L 15/16 |
| 2021/0280170 | A1* | 9/2021 | Chen | G06N 3/0445 |
| 2021/0312923 | A1* | 10/2021 | Gaur | G10L 15/26 |

OTHER PUBLICATIONS

Yi, Cheng, Feng Wang, and Bo Xu. "Ectc-Docd: An End-to-End Structure with CTC Encoder and OCD Decoder for Speech Recognition." INTERSPEECH. 2019. (Year: 2019).*
Hu, et al., "Exploring Pre-Training Wim Alignments for RNN Transducer Based End-to-End Speech Recognition", In Proceedings of arXiv:2005.00572, Apr. 1, 2020, pp. 7079-7083.
"International Search Report and Written Opinion Issued in PCT Application No. PCT/US21/018078", dated May 11, 2021, 13 Pages.
Zhang, et al., "Transformer Transducer: A Streamable Speech Recognition Model With Transformer Encoders and RNN-T Loss", In Proceedings of arXiv:2002.02562, Feb. 7, 2020, 5 Pages.
Bahdanau, et al., "End-to-End Attention-Based Large Vocabulary Speech Recognition", In Proceedings of IEEE International Conference on Acoustics, Speech and Signal Processing, Mar. 20, 2016, pp. 4945-4949.
Bahdanau, et al., "Neural Machine Translation by Jointly Learning to Align and Translate", In Proceeding of International Conference on Learning Representations, May 7, 2015, 15 Pages.
Battenberg, et al., "Exploring Neural Transducers for End-to-End Speech Recognition", In Proceedings of IEEE Automatic Speech Recognition and Understanding Workshop, Dec. 16, 2017, pp. 206-213.
Chan, et al., "Listen, Attend and Spell: A Neural Network for Large Vocabulary Conversational Speech Recognition", In Proceedings of the IEEE International Conference on Acoustics, Speech and Signal Processing, Mar. 20, 2016, pp. 4960-4964.
Chiu, et al., "Monotonic Chunkwise Attention", In Proceedings of the Sixth International Conference on Learning Representations, Apr. 30, 2018, 16 Pages.
Cho, et al., "Learning Phrase Representations using RNN Encoder-Decoder for Statistical Machine Translation", In Proceedings of the Conference on Empirical Methods in Natural Language Processing, Oct. 25, 2014, pp. 1724-1734.
Chorowski, et al., "Attention-Based Models for Speech Recognition", In Advances in Neural Information Processing Systems, Dec. 7, 2015, 9 Pages.
Chung, et al., "State-of-the-art Speech Recognition with Sequence-to-Sequence Models", In Proceedings of IEEE International Conference on Acoustics, Speech and Signal Processing, Apr. 15, 2018, 5 Pages.
Das, et al., "Advancing Acoustic-to-Word CTC Model with Attention and Mixed Units", In Journal of ACM Transactions on Audio, Speech, and Language Processing vol. 27, Issue 12, Dec. 12, 2019, pp. 1880-1892.
Graves, et al., "Connectionist Temporal Classification: Labelling Unsegmented Sequence Data with Recurrent Neural Networks", In Proceedings of the 23rd International conference on Machine learning, Jun. 25, 2006, 8 Pages.
Graves, Alex, "Sequence Transduction with Recurrent Neural Networks", In Repository of arxiv.org/abs/1211.3711v1, Nov. 14, 2012, 9 Pages.
Aves, et al., "Speech Recognition with Deep Recurrent Neural Networks", In Proceedings of the IEEE International Conference on Acoustics, Speech and Signal Processing, May 26, 2013, pp. 6645-6649.
Graves, et al., "Towards End-to-End Speech Recognition with Recurrent Neural Networks", In Proceedings of the 31st International Conference on Machine Learning, Jan. 27, 2014, 9 Pages.
Hinton, et al., "Deep Neural Networks for Acoustic Modeling in Speech Recognition", In Proceedings of the IEEE Signal Processing Magazine, vol. 29, Issue 6, Nov. 2012, pp. 82-97.
Kannan, et al., "Large-Scale Multilingual Speech Recognition with a Streaming End-to-End Model", In Repository of arxiv.org/abs/1909.05330v1, Sep. 11, 2019, 5 Pages.
Kim, et al., "Residual LSTM: Design of a Deep Recurrent Architecture for Distant Speech Recognition", In Repository of arxiv.org/abs/1701.03360v3, Jan. 10, 2017, 5 Pages.
Li, et al., "Advancing Acoustic-to-Word CTC Model", In Proceedings of the IEEE International Conference on Acoustics, Speech and Signal Processing, Apr. 15, 2018, pp. 5794-5798.
Li, et al., "Improving Layer Trajectory LSTM with Future Context Frames", In Proceedings of the IEEE International Conference on Acoustics, Speech and Signal Processing, May 12, 2019, pp. 6550-6554.
Li, et al., "Layer Trajectory LSTM", In Repository of arxiv.org/abs/1808.09522v1, Aug. 28, 2018, 5 Pages.
Miao, et al., "EESEN: End-to-End Speech Recognition using Deep RNN Models and WFST based Decoding", In Proceedings of IEEE Workshop on Automatic Speech Recognition and Understanding, Oct. 18, 2015, 8 Pages.
Moritz, et al., "Triggered Attention for End-to-end Speech Recognition", In Proceeding of IEEE International Conference on Acoustics, Speech and Signal Processing, May 12, 2019, pp. 5666-5670.
Prabhavalkar, et al., "A Comparison of Sequence-to-Sequence Models for Speech Recognition", In Proceedings of 18th Annual Conference of the International Speech Communication Association, Aug. 20, 2017, pp. 939-943.
Rao, et al., "Exploring Architectures, Data and Units for Streaming End-to-End Speech Recognition with RNN-Transducer", In Proceedings of IEEE Automatic Speech Recognition and Understanding Workshop, Dec. 16, 2017, 7 Pages.
Sainath, et al., "Improving the Performance of Online Neural Transducer Models", In Proceedings of International Conference on Acoustics, Speech and Signal Processing, Apr. 15, 2018, pp. 5864-5868.
Sainath, et al., "Streaming End-to-End Speech Recognition for Mobile Devices", In Proceedings of IEEE International Conference on Acoustics, Speech and Signal Processing, May 12, 2019, 5 Pages.
Sak, et al., "Learning Acoustic Frame Labeling for Speech Recognition with Recurrent Neural Networks", In Proceedings of the IEEE International Conference on Acoustics, Speech and Signal Processing, Apr. 19, 2015, pp. 4280-4284.
Sak, et al., "Recurrent Neural Aligner: An Encoder-Decoder Neural Network Model for Sequence to Sequence Mapping", In Proceedings of Interspeech vol. 8, Aug. 20, 2017, pp. 1298-1302.
Seide, et al., "Conversational Speech Transcription Using Context-Dependent Deep Neural Networks", In Proceedings of the Interspeech 2011, Aug. 28, 2011, pp. 437-440.
Sennrich, et al., "Neural Machine Translation of Rare Words with Subword Units", In Proceedings of the 54th Annual Meeting of the Association for Computational Linguistics, Aug. 7, 2016, pp. 1715-1725.
Wang, et al., "Exploring RNN-Transducer for Chinese Speech Recognition", In Proceedings of the Asia-Pacific Signal and Information Processing Association Annual Summit and Conference, Nov. 2019, 5 Pages.

(56) References Cited

OTHER PUBLICATIONS

Wu, et al., "Google's Neural Machine Translation System: Bridging the Gap Between Human and Machine Translation", In Repository of arxiv.org/abs/1609.08144v2, Sep. 26, 2016, 23 Pages.

Zhao, et al., "Improving RNN Transducer Modeling for End-to-End Speech Recognition", In Repository of arxiv.org/abs/1909.12415, Sep. 26, 2019, 8 Pages.

\* cited by examiner

PRE-TRAINING WITH ALIGNMENTS FOR RECURRENT NEURAL NETWORK TRANSDUCER BASED END-TO-END SPEECH RECOGNITION

BACKGROUND

Speech recognition provides means for converting spoken language into text on computing devices. Recurrent Neural Network Transducer (RNN-T) has become an increasingly popular approach for automatic end-to-end speech recognition because RNN-T may be used for online streaming speech recognition. However, RNN-T models are difficult to train due to the complicated structure and large memory cost of RNN-T. A conventional approach relies on the Connectionist Temporal Classification (CTC) model and the RNN Language Model (RNNLM) to initialize the RNN-T parameters. There are significant areas for new and approved mechanisms for initializing the RNN-T parameters.

SUMMARY

An example data processing system according to the disclosure may include a processor and a computer-readable medium storing executable instructions. The instructions cause the processor to perform operations that include receiving an audio input comprising spoken content; analyzing the audio input using a Recurrent Neural Network-Transducer (RNN-T) to obtain textual content representing the spoken content, the RNN-T being pretrained using encoder pretraining or whole network pretraining, wherein encoder pretraining pretrains an encoder of the RNN-T with CE criterion, and wherein whole-network pretraining pretrains the RNN-T as whole using CE criterion, the RNN-T being pretrained based on cross-entropy (CE) criterion obtained from an neural network-based token classification model; and processing the first textual output in with an application on the data processing system.

An example data processing system according to the disclosure may include a processor and a computer-readable medium storing executable instructions. The instructions cause the processor to perform operations that include training a neural network-based token classification model using first token-aligned training data representing a plurality of utterances, wherein each utterance is associated with a plurality of frames of audio data, and wherein tokens representing each utterance are aligned with frame boundaries of the plurality of audio frames; obtaining first cross-entropy (CE) criterion from the Neural network-based token classification model; pretraining an encoder of an RNN-Transducer (RNN-T) based on the first CE criterion obtained from the neural network-based token classification model; and training the RNN-T with second training data after pretraining the encoder of the RNN-T.

An example method performed by a data processing system for training a Recurrent Neural Network-Transducer (RNN-T) according to the disclosure includes training a neural network-based token classification model using first token-aligned training data representing a plurality of utterances, wherein each utterance is associated with a plurality of frames of audio data, and wherein tokens representing each utterance are aligned with frame boundaries of the plurality of audio frames; obtaining first cross-entropy (CE) criterion from the Neural network-based token classification model; pretraining an encoder of an RNN-Transducer (RNN-T) based on the first CE criterion obtained from the neural network-based token classification model; and training the RNN-T with second training data after pretraining the encoder of the RNN-T.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
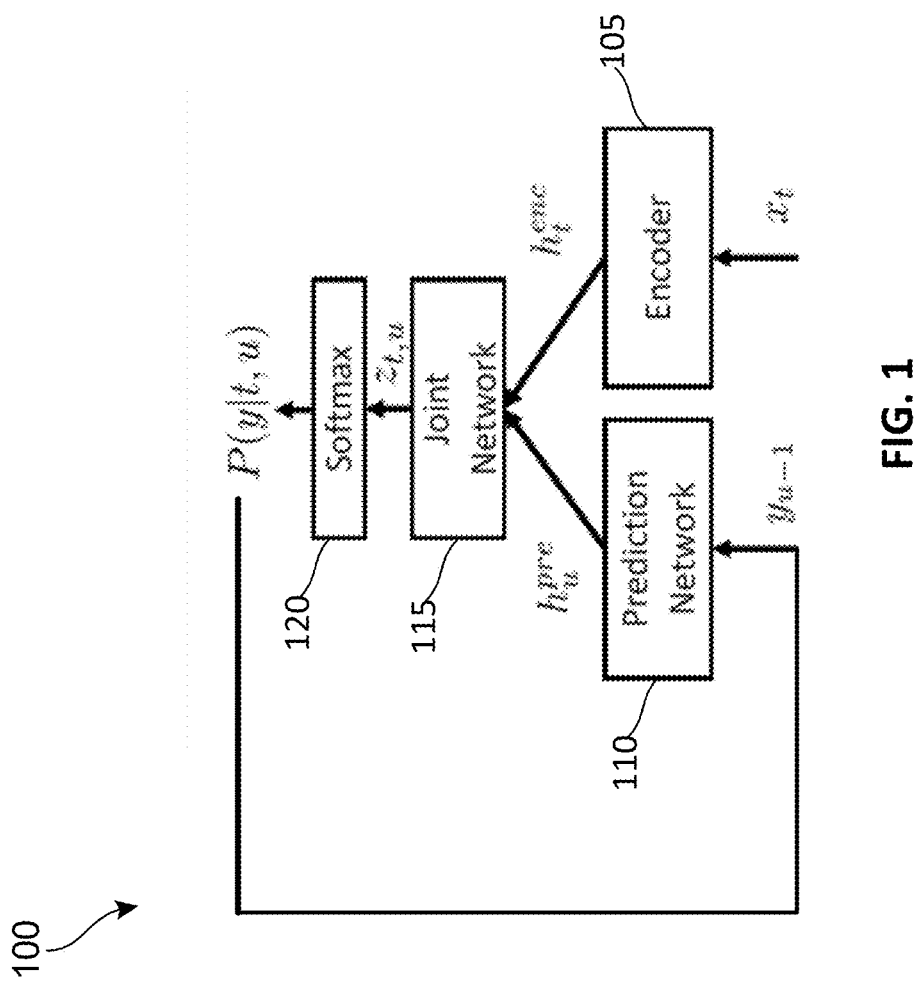
FIG. 1 shows and example of a Recurrent Neural Network Transducer (RNN-T).

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for utilizing external alignments to pre-train RNN-T models are provided. RNN-T models have a very complex structure that makes them difficult to train effectively and such training is a very memory-intensive process. Two different approaches are disclosed herein that provide a technical solution to facilitate training RNN-T models: encoder pre-training and whole-network pre-training. The technical benefits include significant word error rate (WER) reductions compared to conventional training techniques. For example, encode pre-training may achieve 10% relative word error rate reduction compared to training from random initialization and 8% relative word error rate reduction compared to the CTC+RNNLM initialization strategy. Another technical benefit is that latency of the RNN-T model from baseline to a trained model can be significantly reduced.

Significant progress has been made in automatic speech recognition (ASR) techniques that use deep learning algorithms. These deep learning ASR systems typically focus on hybrid frameworks and consist of many components, including but not limited to acoustic models (AM), pronunciation models, and language models (LM). In the conventional training pipeline, these models are either trained separately with different objective functions or need extra expert linguistic knowledge. This disjoint training issue has been addressed by replacing hybrid system with end-to-end (E2E) systems. Connectionist Temporal Classification (CTC), Attention-based Encoder-Decoder (AED), and Recurrent Neural Network Transducer (RNN-T) are three major approaches to E2E systems. Unlike training conventional hybrid models, token alignment information between input acoustic frames and output token sequence is not required when training the E2E models. For example, CTC maps the input speech frames to target label sequence by marginalizing all the possible alignments.

CTC is a type of neural network output and associated scoring function that may be used for training RNNs such as long short-term memory (LSTM) networks for handling sequence problems where the timing is variable, such as recognizing phonemes in speech. CTC may refer only to the outputs and scoring and may not be dependent upon a particular neural network structure. CTC may receive a sequence of observations and output a sequence of labels. The labels may include blank outputs. Blank outputs may be non-character outputs, which can be inserted between characters. CTC does not attempt to learn boundaries and timing, and thus, does not take alignment into account when determining a label for an input. Therefore, multiple observations may map to a single label if they only differ with respect to alignment.

A dynamic programming based forward-backward algorithm may be used to train the model in CTC. An advantage of the CTC approach is that it provides frame level decoding, and thus may be applied for online speech recognition. A disadvantage of the CTC approach is that CTC treats the input acoustic frames as being conditionally independent. In other words, each frame is processed independently without any consideration of the previously processed acoustic frames. AED does not operate under this assumption, but AED has a signification drawback in that the entire input sequence is required to start the decoding process due to the global attention mechanism, which makes it challenging for real-time streaming ASR, despite some recent attempts along this direction.

RNN-T is an extension of the CTC model that removes the output independence assumption of CTC. Labels are conditioned on the full history of previous non-blank labels. Furthermore, duplicated outputs are not accepted except for blank outputs. RNN-T includes three components: an encoder, a prediction network, and a joint network which integrates the outputs of encoder and prediction networks together to predict the target labels. The encoder utilizes an acoustic model (AM), which is statistical representation of sounds that make up each word, to map each frame of audio input to a high-level feature representation of that audio input. The prediction network utilizes a language model (LM), which is a statistical representation of word sequence in the language, to map audio input to word sequences in the language. Because RNN-T includes the prediction network, the RNN-T emits output tokens that are conditioned on the previous prediction results, which is in direct contrast to CTC which emits output tokens which are independent of previous prediction results. As a result, RNN-T may be much more difficult to train compared to CTC or AED due to the model structure and the synchronous decoding constraint. RNN-T also tends to be very memory intensive during training due to the 3-dimensional output tensor. The difficulty in training the RNN-T may be addressed at least in part by initializing the encoder of an RNN-T with a CTC model and the prediction network of the RNN-T with an RNNLM.

The techniques disclosed herein utilize other model initialization approaches to overcome the training difficulty of RNN-T models. Specifically, these techniques utilize external token alignment information to pretrain RNN-T. Two types of pre-training methods are disclosed in the instant application: encoder pretraining and whole-network pretraining. Encoder pretraining refers to initializing the encoder in the RNN-T only, while the other components are trained from a random initialization. In contrast, the whole-network pretraining approach pretrains the whole network by an auxiliary objective function instead of the RNN-T loss. The techniques disclosed herein have been evaluated on 3,400 hours voice assistant data and 65,000 hours production data. The experimental results show that the accuracy of RNN-T model can be significantly improved with the proposed pretraining methods disclosed herein, with up-to 28% relative word error rate (WER) reduction. The pretraining of the RNN-T also provide technical benefits of at least improved computing processing and memory usage by facilitating a more efficient and less memory intensive means of training RNN-T. Furthermore, the improved accuracy of these models may also significantly improve Automated Speech Recognition (ASR) accuracy, which may improve numerous services utilizing these models, such as but not limited to automated transcription services, voice command and control systems, and dictation services.

FIG. 1 shows an example of an RNN-T model 100. The RNN-T model 100 includes an encoder 105, a prediction network 110, and a joint network 115. The RNN-T model 100 was originally proposed as an extension of the CTC model. In contrast with the CTC model, the RNN-T emits output tokens which are condition on the previous prediction results. Specifically, the prediction network 110 receives a previous output token from the RNN-T as an input. Specifically, the encoder 105 in the RNN-T model is an RNN that maps each acoustic frame $x_t$ to a high-level feature representation $h_t^{enc}$ using the function $f^{enc}$, where t is the time index:

$$h_t^{enc} = f^{enc}(x_t)$$

The function $f^{enc}$ represents the output of the RNN implementing the encoder 105. The prediction network 110, which is also based on RNNs, converts previous non-blank output token $y_{u-1}$ to a high-level representation $h_u^{pre}$, where u is the label index of each output token.

$$h_u^{pre} = f^{pre}(y_{u-1})$$

The function $f^{prec}$ represents the output of the RNN(s) implementing the prediction network 110. The predicted symbols output by the Softmax layer 120 are fed back through the model to the prediction network 110 as $y_{u-1}$ to ensure that the predictions $h_u^{pre}$ are conditioned both on the audio samples so far and on past outputs. The Softmax assigns decimal probabilities to each class in a multi-class problem. The decimal probabilities add up to 1.0. These values may permit the training of the network to converge more quickly than might otherwise. The Softmax is fitted through training to model the probability of a particular label.

Given the hidden representations of both acoustic features and labels from the encoder 105 and prediction network 110, the joint network 115 integrates the information using a feed-forward network as:

$$z_{t,u} = f^{joint}(h_t^{enc}, h_u^{pre})$$

The posterior probability P(y|t, u) can be obtained by taking the Softmax operation performed by the Softmax layer 120 over the output of the joint network 115. A forward-backward algorithm is executed on the three-dimensional output from the Softmax operation 120 to compute the total probability P(y|x) of the output sequence y, conditioned on the input sequence x. The negative log-loss of the target sequence is used as the object function to train the model:

$$L_{RNN-T} = -\log P(y|x)$$

The RNN-T performs decoding of an audio input using a frame-by-frame approach. Starting from the first frame fed to the encoder 105, if the current output is not blank, then the prediction network 110 is updated with that output token. Otherwise, if the output is blank, then the encoder 105 is updated with the next frame. The decoding terminates when the last frame of input sequence is consumed. The RNN-T can support real-time streaming using this approach. Greedy search and beam search can be used in the decoding stage, which stores different numbers of intermediate states.

A greedy search algorithm is an algorithm that uses a heuristic for making locally optimal choices at each stage with the hope of finding a global optimum. The greedy search algorithm does not backtrack to reevaluate choices made by the algorithm in earlier stages. Beam search is another greedy algorithm that explores a graph by expanding the most promising node in a limited set. Beam search is an optimized form of best-first search, which reduces the memory requirements. While best-first search is a graph search which orders all partial solutions or states according to a specified heuristic, beam search may only retain a predetermined number of best partial solutions or states as candidates.

Figure 2:
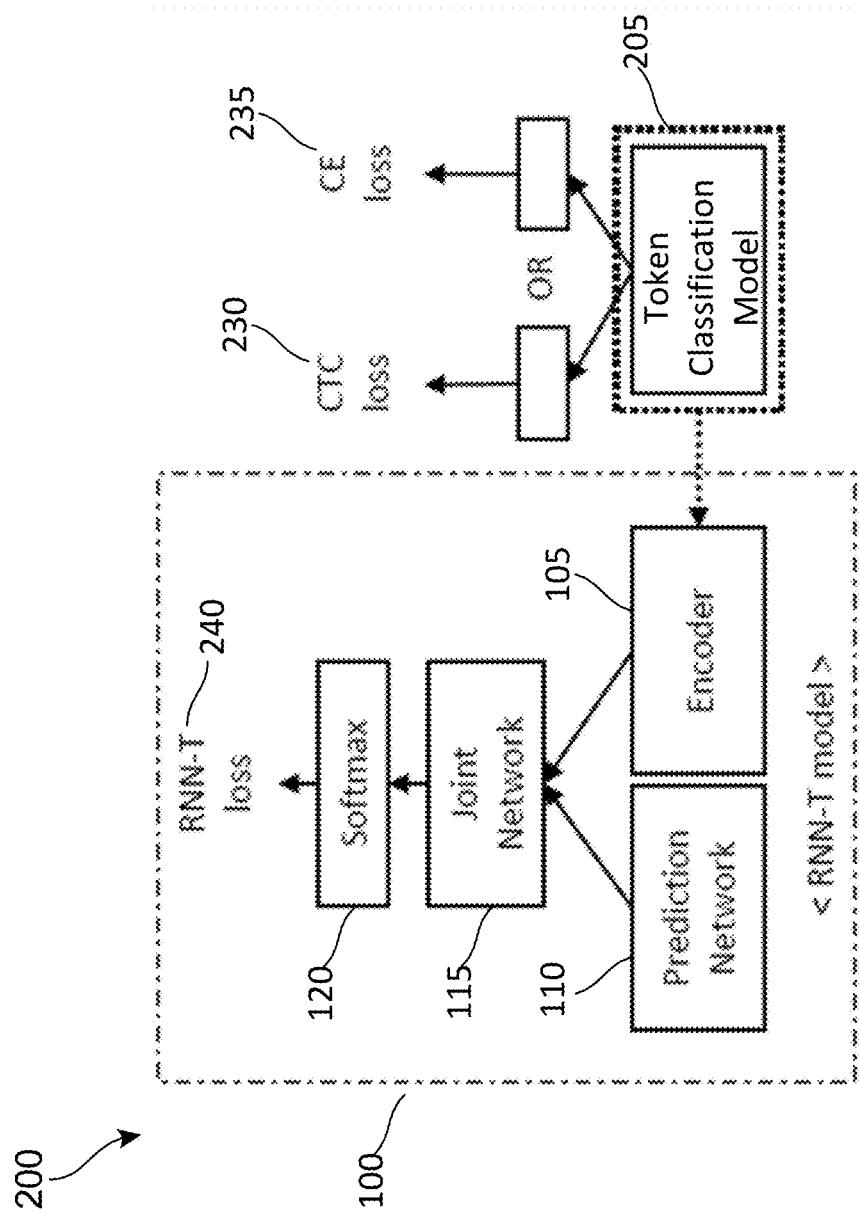
FIG. 2 shows details associated with pre-training of the RNN-T model of FIG. 1.

FIG. 2 shows details associated with pre-training of the RNN-T model 100 from FIG. 1. In an RNN-T model 100, the encoder 105 and the prediction network 110 usually have different model structures, which make it difficult to train them well at the same time. Directly training RNN-T from the random initialization may result in a biased model toward on one of the model components, i.e. dominated by acoustic input or language input. Conventional approaches to training the RNN-T model 100 often use an initialization strategy that initializes the encoder 105 with a CTC model and the prediction network 110 with an RNNLM. However, the output sequence of the CTC is series of spikes separated by blank. Thus, after CTC-based pre-training, most of the encoder output $h_t^{enc}$ generate blank, which results in a wrong inference for the RNN-T model.

The techniques disclosed in the instant application provide a technical solution to the shortcomings of the conventional training techniques disclosed above by pretraining the encoder 105 using Cross Entropy (CE) criterion. CE is a loss function that may be used to measure how well the model is performing. The CE loss represents the entropy or difference between a reference probability distribution for a particular input and the actual probability distribution output by the model. The reference probability distribution, also referred to as a "ground truth" probability distribution represents an expected output of the model for particular input. If the probability distribution output matches the reference probability output for a particular input, the loss is zero. The loss increases as the difference between the reference probability distribution and the actual probability distribution output by the model increases. The CE criterion can be used to train the model by configuration the model parameters such that the predictions of the model have a low CE loss on average across a set of reference data.

Furthermore, the techniques disclosed herein also regard the encoder 105 as a token classification model rather than a CTC model as in conventional RNN-T training techniques. The examples that follow discuss training a neural network-based token classification model using first token-aligned training data representing a plurality of utterances. Each utterance may include multiple frames of audio data. The training token-aligned training data may include a representation of each utterance as a series of tokens that are aligned with frame boundaries of the of the audio frames that make up the utterance.

To facilitate training the encoder using 105 of the RNN-T 100 using CE criterion, a neural network-based token classification model 205 is first trained with the CE loss 235. The neural network-based token classification model may be implemented using various types of neural networks, including but not limited to RNNs, Feed Forward Networks (FFNs), Convolutional Neural Networks (CNNs), and Transformer Neural Networks (TNNs). In one implementation, the term 'CE loss' is used herein to represent the cross entropy loss function, and 'CTC loss' 230 is used herein to represent the CTC forward-backward algorithm based loss function, and 'RNN-T loss' to represent the RNN-T loss function 240. A loss function is used to evaluate how well the learning algorithm models the corresponding database. The higher the value output from the loss function, the worse the predictions were by the learning algorithm. Conversely, the lower the value output from the loss function, the better the predictions were by the learning algorithm. The CE loss measures the performance of a classification model whose output is a probability value between 0 and 1. The CE loss increases as the predicted probability diverges from the actual label.

The techniques disclosed in the instant application may use word piece units as target tokens. In one implementation, a "word piece" as used in the instant application refers to dividing words into a set of common sub-word units referred to herein as "word pieces". With word-level alignments, the boundary frame index of each word can be determined. For a word which is divided into multiple word pieces, the total frames inside the word boundary are equally allocated to its word pieces. A marginal case in which a word contains more word pieces than frames may occur, which prevents generating token alignments. However, this marginal case is quite limited and typically appears in less than 0.01% of all the training utterances. These utterances are removed in the pretraining stage to obtain hard alignments of target tokens for all of the frames. Furthermore, while the example discussed here refer to tokens as being sub-words or word pieces, the tokens may also be letters or content-dependent or content-independent phones or other sub-units of words. Phones may be any distinct speech sound or gesture, and may be context dependent or context independent.

Based on the encoder structure, one extra fully connected layer is added on top of the encoder, in which the output $h_t^{enc}$ is used for token classification. The objective is $$L_{enc} = \sum_{k=1}^{K} y_{t,k} * \log(softmax(f^{fc}(h_{t,k}^{enc})))$$

where $f^{fc}$ represents a fully connected layer, k is the label index and K denotes the largest dimension, which is the dimension of $z_{t,u}$. And $y_t$ is the word piece label for each input frame $x_t$. After the encode pre-training, each output $h_{enc}$, which is the high-level representation of the input acoustic features, is expected to contain the alignments information.

Figure 3A:
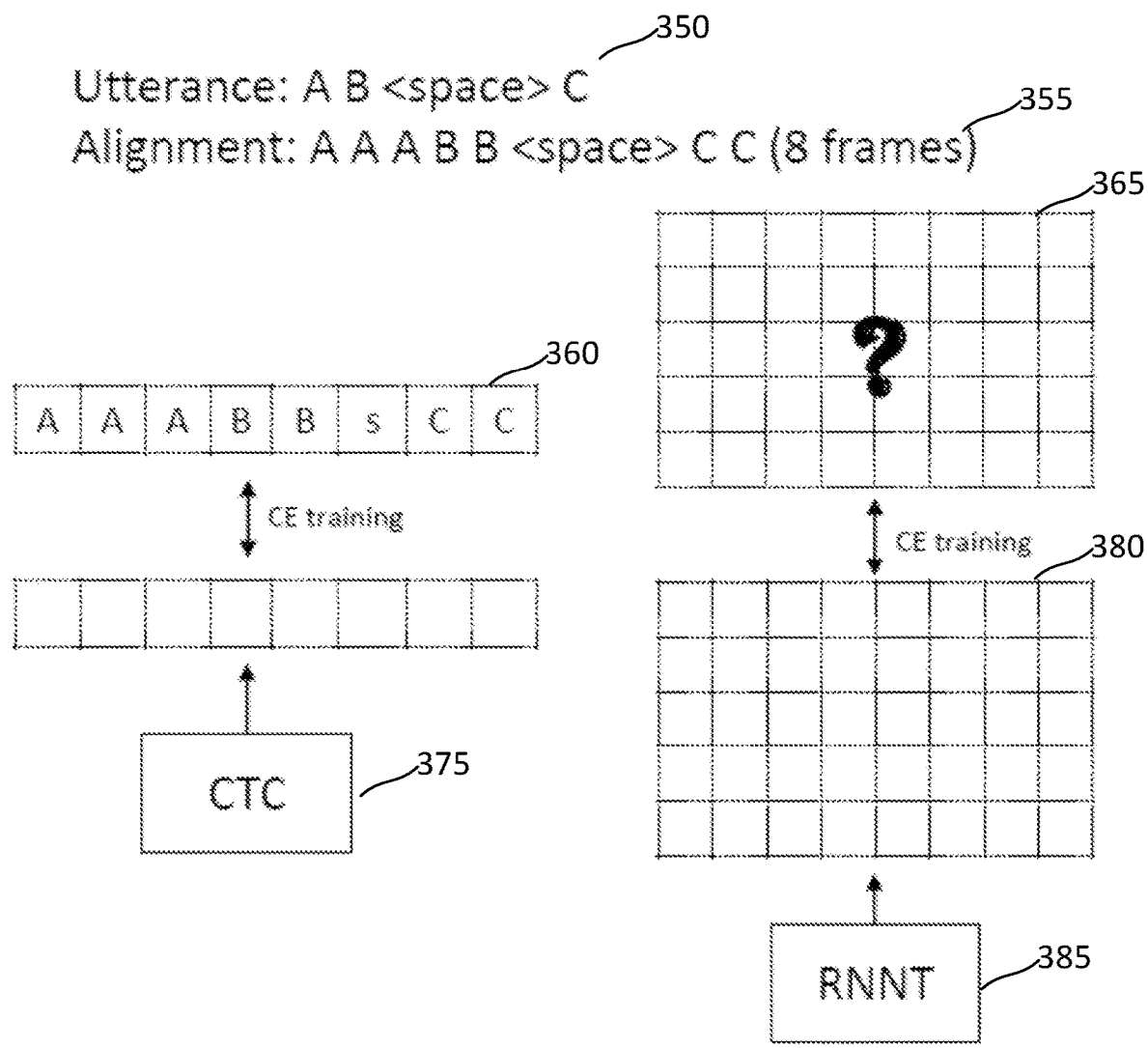
FIG. 3A is a diagram showing differences between the models that may be used to train the encoder and the prediction network of the RNN-T of FIG. 1.

FIG. 3A shows an example of pre-training that shows aspects of the techniques disclosed herein. The example uses an utterance 350 'A B<space>C' to illustrate these concepts. The frame alignment 355 of the utterance is as follows: 'AAA' represents 'A' being uttered over the first three frames, 'BB' represents 'B' being uttered over the next two frames, a pause or space in the utterance is included in the next frame, and CC represents 'C' being uttered over the final two frames.

FIG. 3A shows one of the challenges associated with the training both the encoder 105 and the prediction network 110 using CE criterion. For whole network pre-training, all of the RNN-T models are pretrained with the external token alignment information, which means that the models for the encoder 105, the prediction network 110, and the joint network 115 are all trained simultaneously. This can present an additional challenge as the ground truth labels used to determine the CE criterion are two dimensional, while the output of the RNN-T is three-dimensional. The ground truth labels represent what the output of the model is expected to be for a particular input. The CE criterion can be determined by comparing the ground truth label to the output of the model for the input using various techniques known in the art. To use the CE criterion to train the RNN-T, the two-dimensional ground truth labels must be converted to three dimensions in order to be matched with the output of the RNN-T. The examples which follow describe how these three-dimensional labels may be determined based on the alignment path for an utterance.

In the example shown in FIG. 3A, a comparison between CE loss pre-training for a CTC model 375 and an RNN-T model 385 is shown. The RNN-T model 385 may be the same as model 100 in the preceding examples. CE loss pre-training for the encoder 105 may utilize a two-dimensional ground truth label array 360 which includes a representation of the utterance 350. In the CE loss pre-training, the two-dimensional ground truth label array 360 may be compared with an output of the CTC model 375 to determine the CE criterion. In contrast with the two-dimensional array used to train the CTC model 375, a three-dimensional ground truth label array 365 may be used to train the RNN-T model 385 in CE loss pre-training by comparing the label array 365 with an three-dimensional output 380 of the RNN-T 385. The examples that follow demonstrate how the three-dimensional ground truth label arrays (also referred to herein as "label tensors") may be created.

Figure 3B:
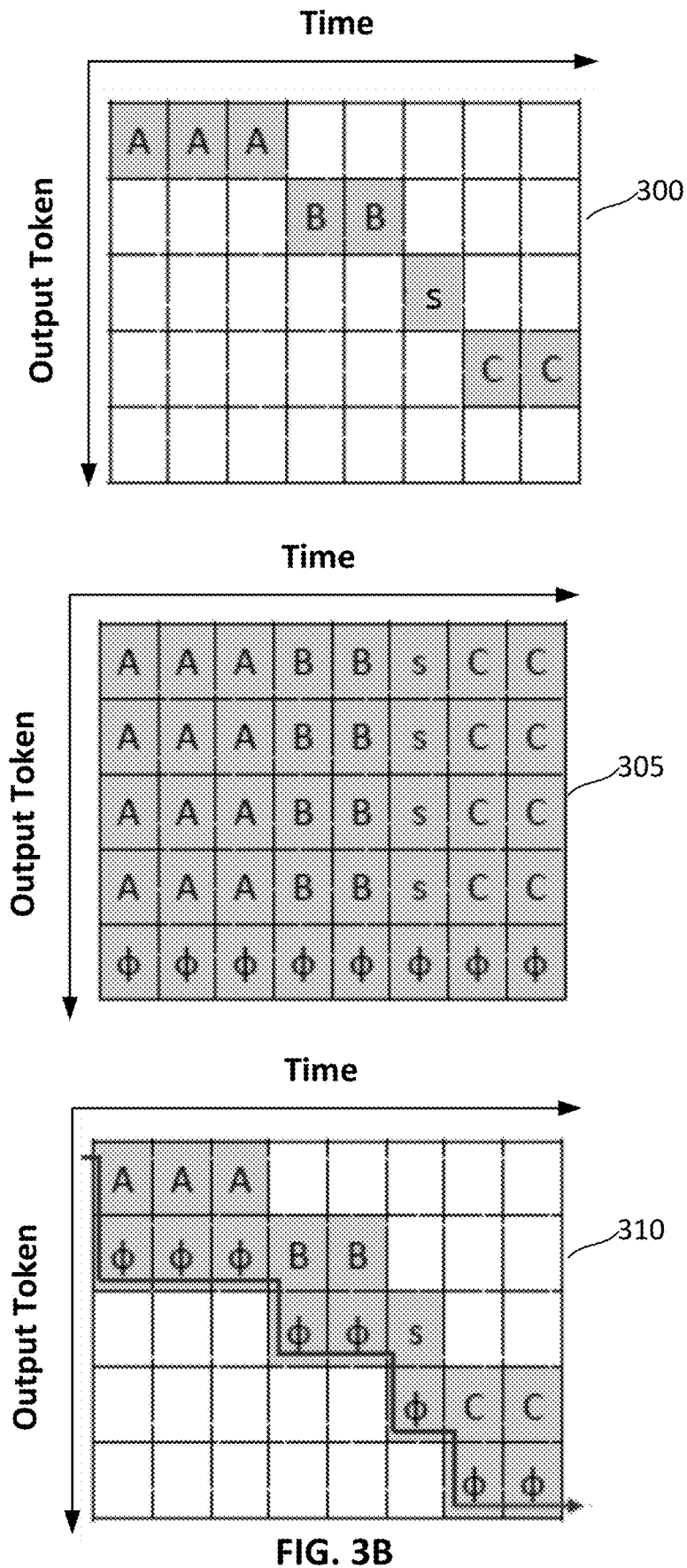
FIG. 3B is a diagram that shows examples of designed label tensors for whole-network pretraining.
Figure 3C:
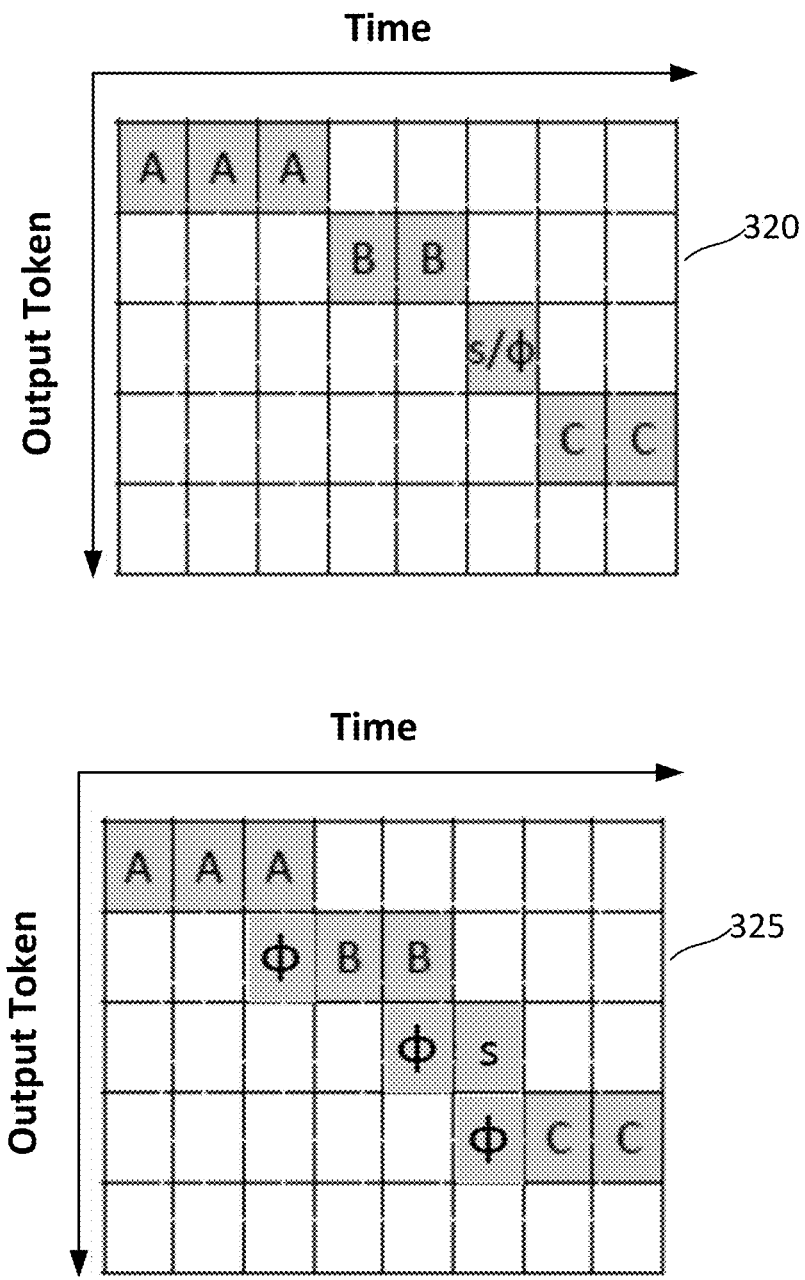
FIG. 3C is a diagram that shows additional examples of designed label tensors for whole-network pretraining.

FIGS. 3B and 3C show examples of creating three-dimensional token-aligned training data that may be used in whole-network training of the RNN-T. The training data represents utterances that are aligned with frame boundaries of the frames of audio data associated with the utterance. FIGS. 3B and 3C show examples of three label tensors 305, 310, and 320 that are based on an alignment path 300 for the utterance 350. The alignment path 300 represents expected alignment information for the utterance 350, which is the 8-frame utterance 'A B s C' with the alignment 'A A A B B s C C' shown in FIG. 3A. The alignment path 300 demonstrates the expected output token (vertical axis) for each frame (horizontal axis). One way to address the problem of whole-network training is to only compute the CE for the alignment path of the label matrix. However, this approach may be problematic. The valid part of the label matrix does not include a blank token. As a result, it may be difficult to train the model when the output is very long, because it will be difficult for the network to learn the position and the alignment at the same time. Accordingly, three designed label tensors 305, 310, and 320 are presented that provide improved results without the problems presented by just computing the CE for the alignment path of the label metric.

The example includes three different tensors y: tensor 305, tensor 310, and tensor 320. Among encoder pre-training methods, the encoder 105 typically performs token mapping (CTC loss pre-training) or token aligning (CE loss pre-training). However, these pre-training methods only consider part of the RNN-T model. In contrast, the techniques disclosed herein may utilize whole-network pre-training method with the use of external token alignments information. The CE loss between the three-dimension model output z and a designed three-dimension label tensor y is optimized. y is conditioned on the token alignments of each utterance.

The three designed label tensors 305 (also referred to herein as "$y_1$"), 310 (also referred to herein as "$y_2$"), and 320 (also referred to herein as "$y_3$") represent a one-hot vector and are based on the 8-frame utterance 'A B s C' with the alignment 'A A A B B s C C' shown in FIG. 3A. In each label tensor, 's' represents a space and 'ϕ' represents a blank. Only gray squares of the grids are used for computing the CE. The arrow in tensor 310 represents the decoding path when decoding. The blank is a non-character and is distinguished from the space character which represents a white-space character. Blank is treated as an extra class and represents a one-hot vector in the label tensor. In each of the three label tensors shown in FIG. 3B, the horizontal axis represents the time dimension from left to right, and the vertical axis represents the output token dimension from top to bottom.

In the example label tensor 305 ($y_1$), all of the output target grids of each frame in $y_1$ are set to the one-hot vector corresponding to its alignment label. The last row of the label tensor is set to all blank, which represents the end of the utterance. Thus, after pre-training, encoder output $h_t^{enc}$ should contain the alignment information. However, $y_1$ only considers the frame-by-frame alignment and ignores the output token level information. Because y1 includes no token-dimension information for pre-training, the correct inference sequence will not be obtained if RNN-T decoding is performed on $y_1$.

In contrast with the example label tensor 305 ($y_1$), the label tensor 310 ($y_2$) takes the decoding process into consideration and each frame is assigned to its respective token alignment. Labels are conditioned on the full history previous non-blank labels. Target token position is determined by its sequence order. When perform pre-training, the CE is only computed from the nonempty part of the label tensor. The blank token is inserted under each target token to ensure the correct decoding results. If we directly perform the RNN-T decoding algorithm on the label tensor $y_2$, correct results should be obtained. The decoding path is shown by the red on the label tensor $y_2$ in FIG. 3B. Thus, by directly performing the decoding on $y_2$ of the given example, the inference result is 'A ϕϕϕBϕϕsϕCϕϕ'. After removing blank tokens, the final result is 'A B s C', which matches the alignment of this utterance.

However, in $y_2$, almost half of the valid part is blank, so that blank tokens dominate in the pre-training process. In contrast with the example label tensor 310 ($y_2$), the label tensor 320 ($y_3$) only retains the non-blank portion of $y_2$. The label tensor $y_3$ only includes one grid entry with its corresponding alignment for each frame. In order to provide the blank information during the pre-training stage, a short pause (space token less than 3 frames) of each utterance is set to blank. That means some space in the valid part of the label tensor will become blank. Thus, a part of the alignment path in the label matrix becomes blank.

Example label tensor 325 is an alternative to y3 in which a blank is set at the end of the boundary for each output label. In this alternative implementation, a part of the alignment path does not become blank as in the preceding example.

After the whole-network pre-training, the whole network's CE loss is replaced with RNN-T loss, and standard RNN-T training may be performed.

Figure 4:
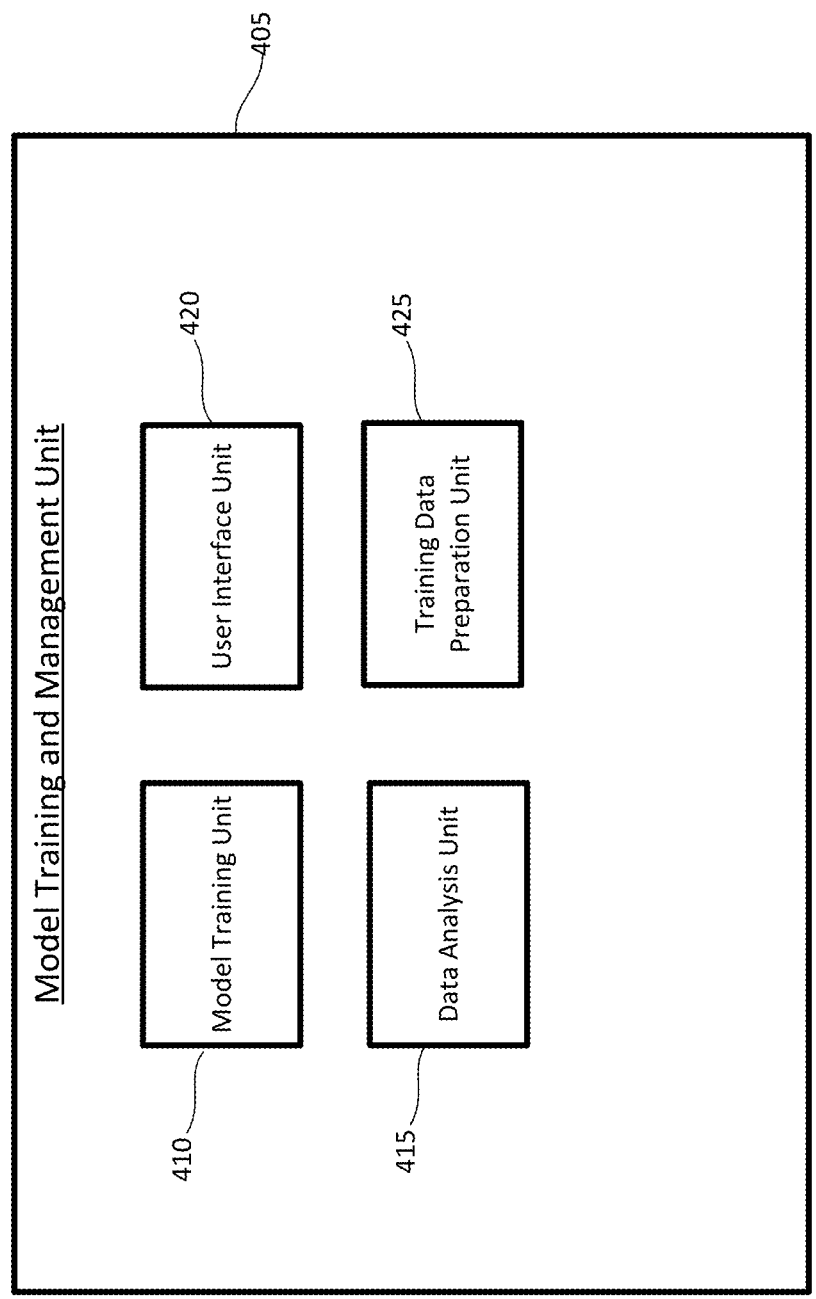
FIG. 4 is a diagram of a model training and management unit 405 that may be used to train and manage the usage of the RNN-T of FIG. 1.

FIG. 4 is a diagram that shows an example model training and management unit (MTMU) 405. The MTMU 405 may be used to implement the techniques disclosed in the instant application. The MTMU 405 may be implemented on a computing device, such as the computing device shown in FIG. 7. The MTMU 405 may include a model training unit 410, a data analysis unit 415, a user interface unit 420, and a training data preparation unit 425. The MTMU 405 may be implemented on various types of computing devices, including but not limited to a computer server, a cloud-based computing environment including multiple servers, a desktop computing device, and/or various types of computing devices that have sufficient processing resources to handle the processing associated with the various techniques disclosed herein.

The model training unit 410 is configured to initialize the RNN-T and the various models used by the RNN-T according to the techniques disclosed herein. The model training unit 410 may perform the encoder pretraining and/or the whole-network pretraining techniques discussed in the preceding examples. The model training unit 410 may also train the RNN-T using conventional training techniques after the pretraining techniques have been applied. For example, the model training unit 410 may be configured to process a set of test data to further train the RNN-T after the pretraining. The pretraining techniques can significantly reduce the word error rate (WER) compared to conventional training techniques.

The data analysis unit 415 may be configured to analyze data using a trained RNN-T model. The data analysis unit 415 may be configured to maintain multiple machine learning models in a persistent memory of the computing device and may provide, via the user interface unit 420, means for allowing a user to select one or more trained machine learning models to be deployed for use on the computing device and/or one or more remote computing devices. For example, the models may be trained using the pretraining and training techniques disclosed in the instant application before being deployed to one or more computing devices on which the model will be used to make predictions on actual, non-test and non-training data.

The user interface unit 420 may be configured to generate a user interface that may be rendered on a display of the computing device on which the MTMU 405 is implemented and/or accessible to one or more remote computing devices. The user interface unit 420 may provide a user interface that allows a user to pretrain and/or train machine learning models, to view, create, and/or modify the pretraining and/or training data, and/or to deploy a trained model to a production environment on the computing device and/or to other computing devices.

The training data preparation unit 425 may be configured to identify non-aligned data in the pretraining data and to remove that data from the pretraining data used by the pretraining techniques disclosed in the instant application. As discussed in the preceding examples, the pretraining data may include word piece units or other sub-units of words as target tokens. For words which are divided into multiple word pieces or other sub-units, the total frames inside the word boundary are allocated equally to the word pieces or other sub-units. Token alignment is not possible for words that include more word pieces or other sub-units than frames, and the training data preparation unit 425 may eliminate those words from the training utterances used for pretraining. Thus, the pretraining data includes hard alignments of the target tokens for all of the frames.

Figure 5:
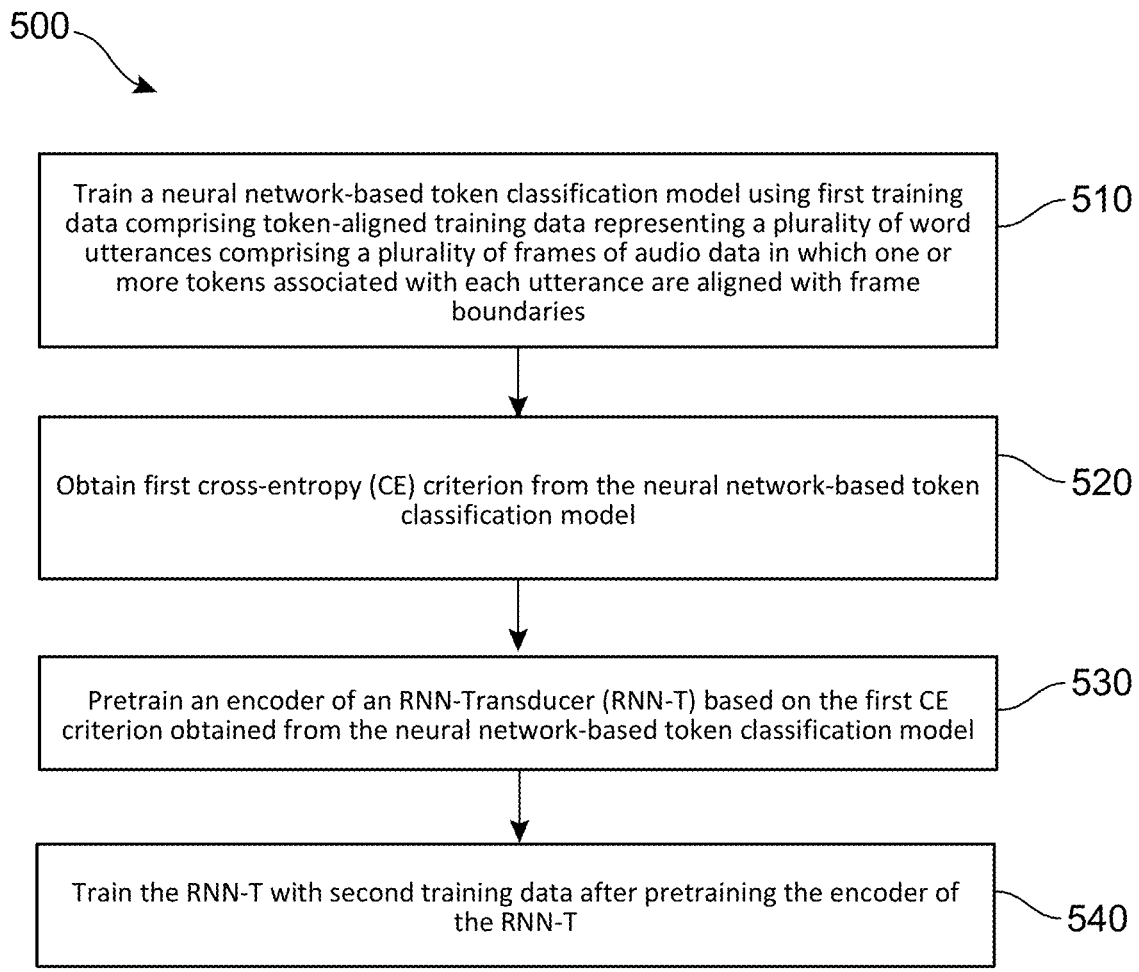
FIG. 5 is a flow chart showing an implementation of an example process executed by a data processing system for training an RNN-T, such the RNN-T of FIG. 1.

FIG. 5 is a flow diagram of an example process for training an RNN-T according to the techniques disclosed herein. The process shown in FIG. 5 may be implemented by the MTMU 405 shown in FIG. 4.

The process 500 may include an operation 510 training a neural network-based token classification model using first token-aligned training data representing a plurality of utterances. Each utterance is associated with a plurality of frames of audio data, and tokens representing each utterance are aligned with frame boundaries of the plurality of audio frames. As discussed above with respect to encoder pretraining, a neural network-based token classification model can be trained using training data in which utterances have been broken up into tokens that represent an utterance in an audio input that is divided into a set of frames. These tokens may represent sub-words or word pieces or other elements of an utterance, such as but not limited to letters or phones. The training data may be token aligned such that each of the tokens aligns with a frame, and training data in which the token alignment is not possible due to the number of tokens exceeding the number of frames may be discarded. Training the model using token aligned data can provide significantly reduced error rates from the RNN-T.

The process 500 may include an operation 520 of obtaining first CE criterion from the neural network-based token classification model. The neural network-based token classification model is trained on the token-aligned data which may provide better classification results. The first CE criterion may be determined based on the training from operation 510. The CE criterion may be obtained using the techniques discussed with respect to FIG. 2. The CE criterion may represent a divergence between expected outputs and reference outputs of the model.

The process 500 may include an operation 530 of pretraining the encoder of the RNN-T based on the first cross-entropy criterion from the neural network-based token classification model. The external neural network-based token classifier may be trained using this data, and the cross-entropy (CE) loss function obtained from training the external neural network-based token classifier may be used to train the encoder 105 and/or other elements of the RNN-T. This approach may provide significant improvements in Word Error Rates (WER) compared to initializing the encoder 105 using a CTC model as in the conventional approaches to initializing an RNN-T. The CE loss function takes into account alignment information for the tokens that make up an utterance in contrast to CTC which ignores such alignment information.

The process 500 may include an operation 530 of training the RNN-T with second training data after pretraining the encoder of the RNN-T. Because the encoder of the RNN-T has been pretrained with token-aligned data, the RNN-T may produce better results when training data for the model as a whole is used to train the RNN-T. The WER may be lowered significantly by using the encoder pretraining and/or whole-network pretraining techniques disclosed herein.

The process shown in FIG. 5 may optionally include additional operations that are not shown in FIG. 5. For example, the process shown in FIG. 5 may include an additional operation of generating the token-aligned training data from a source training data. As discussed with respect to FIG. 2, token-aligned training data may be generated from source training data. The source training data may include a mix of training data in which a first subset of the training data includes tokens that represent an utterance that are aligned with frame boundaries of the audio signal representing the utterance and a second set of training data that includes tokens that are not aligned with frame boundaries of the audio signal representing the utterance. The tokens may be sub-words or word pieces, letters, or content-dependent or context-independent phones. The sub-words or other token values may be selected from a predetermined set of sub-words or other token values. The training data preparation unit 425 of the MTMU 405 may be configured to discard training data for which the tokens do not align with frame boundaries. The training data preparation unit 425 may be configured to access source training data stored in a memory of the computing device on which the MTMU 405 is implemented. The source training data may include source training data elements that are each associated with a single utterance. The training data preparation unit 425 may be configured to test each source training data element to eliminate those source training data elements which are not token aligned. The training data preparation unit 425 may make this determination by dividing a word associated with a training data element into a plurality of tokens. The training data preparation unit 425 may also make a determination as to how many frames of audio data make up the audio input that includes the utterance. If the number of frames of audio data matches or exceeds the number of tokens, the training data preparation unit 425 may add the training data element to a set of token-aligned training data that may be used to train the encoder 105. The token-aligned training data may be stored in a persistent memory of the computing device on which the MTMU 405 is implemented. The token-aligned training data may be stored in a datastore used to store training data that may be used to train the encoder 105.

The process shown in FIG. 5 may include an additional operation of performing a function of processing an output of the encoder of the RNN-T with an additional fully-connected layer to add alignment information to a high level representation of each frame of acoustic data, such as that discussed above with respect to FIG. 2.

The process shown in FIG. 5 may include an additional operation of pretraining a prediction network of the RNN-T based on the CE criterion obtained from the neural network-based token classification model. In the whole-network training model discussed in the examples shown in FIGS. 3A-3C, all of the models of the RNN-T 100 may be trained at the same time using three-dimensional ground truth labels. The three-dimensional ground truth labels may be derived from two-dimensional ground truth labels that may be used to train a neural network-based token classification model discussed above. The three-dimensional ground truth labels may be based on the alignment path associated with the utterance. In some implementations, generating the three-dimensional ground truth label may include identifying a space token representing a pause in the utterance and replacing that space token with a blank token to facilitate training of the RNN-T. If the alignment path is too long without any blank, the model may have a difficult time learning that particular utterance.

The process shown in FIG. 5 may include an additional operation of optimizing a CE loss between the three-dimensional label matrix and an output of the model. As discussed above with respect to FIGS. 3B and 3C, the RNN-T may be trained by optimizing the CE loss between the ground truth label matrices and the output of the RNN-T.

The techniques disclosed in the instant application have been evaluated on 3,400 hours Microsoft Cortana voice assistant data and 65,000 hours Microsoft production data. For the Cortana data, the training data set consists of approximately 3,400 hours of audio spoken in American English and the test data set consists of approximately 6 hours of audio spoken in American English. The 65,000 hours production data are transcribed data from all kinds of Microsoft products. The test sets cover 13 application scenarios such as Cortana and far-field speaker, with totally 1.8 million (M) words. The training and test data have been anonymized with all personally identifiable information removed.

The techniques disclosed herein were first evaluated on Cortana voice assistant data first, and then a selected technique is evaluated on the large scale 65,000 hours of production data. The input feature is 80-dimension log Mel filter bank for every 10 milliseconds (ms) speech. Eight of these filter banks are stacked together to form an input frame to the encoder, and the frame shift is 30 ms. The encoders used have 6 hidden-layer Long short-term memory (LSTM) artificial recurrent neural network (RNN) architectures (LSTMs), and the prediction networks used to evaluate the techniques disclosed herein have 2 hidden-layer LSTMs.

The joint network has two linear layers without any activation functions. Layer normalization is used in all LSTM layers, and the hidden dimension is 1280 with the projection dimension equal to 640. The output layer models 4,000 word piece units together with the blank token. The word piece units are generated by running byte pair encoding on the acoustic training texts. Byte pair encoding is a simple form of data compression in which the most common pair of consecutive bytes of data is replaced with a byte that does not occur within that data.

Figure 8:
FIG. 8 is a table that shows results of whole-network pre-training on the final word error rate (WER).

FIG. 8 is a table 800 that shows results of whole-network pre-training. Table 8 compares results of an RNN-T baseline with results obtained from a pre-trained whole network. The RNN-T baseline used to perform the testing is trained from the random initialization of the RNN-T model. For pre-trained models, the whole network is pre-trained with CE loss at first, then trained with RNN-T loss. Using the pretrained network as the seed, the final word error rate (WER) can be significantly reduced. All designed label tensors can improve the RNN-T training, achieving 10% to 12% relative WER reduction. In the example shown in FIG. 8, pre-training methods were used on 3,400 hours of Cortana data. Pre-train (all align) uses $y_1$ (tensor 305), Pre-train (correct decoding) uses $y_2$ (tensor 310), and Pre-train (align path-sp blank) uses y3 (tensor 320) as the target label sensors, respectively.

Figure 9:
FIG. 9 is a table that shows results of encoder pre-training techniques on the WER.

FIG. 9 is a table 900 that shows results of encoder pre-training techniques on 3400 hours of Cortana data. Table 900 provides a WER comparison of different encoder pre-training methods on 3400 hours Cortana data. Greedy search was used. 'CTC' as used in FIG. 9 refers to pre-training of CTC loss with target sequence, 'CE' refers to pre-training of CE loss with target alignment, and 'no' refers to training from the random initialization.

Using a pre-trained CTC to initialize the encoder does not improve the WER results shown in table 900. This is because the output of CTC is a sequence of spikes, in which there are lots of blank tokens without any meaning. Hence, if the pre-trained CTC is used as the seed for the encoder of RNN-T, most encoder output $h_t^{enc}$ will generate blank, which does not help the RNN-T training. Using the CE loss pre-trained encoder to initialize the encoder of RNN-T achieves significant improvement compared with training from the random initialization. This approach provides 28% relative WER reduction from the RNN-T baseline and CTC based encoder pre-training.

Among all the encoder pre-training experiments in table 900, the prediction network 110 and joint network 115 are all trained from the random initialization. The only difference is the parameters seed of encoder. When comparing CTC loss-based and CE loss-based encoder pre-training methods, there is a substantial WER gap between these two approaches. Initializing the encoder as a token aligning model rather than a sequence mapping model results in the much better accuracy. This is because the RNN-T encoder performs the frame-to-token aligning, which extracts the high-level features of each input frame.

Figure 10:
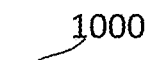
FIG. 10 is a table that shows results of different encoder pre-training methods on the WER.

FIG. 10 shows a table 1000 that provides a WER comparison of different encoder pre-training methods using a large data set that includes 65,000 hours of production training data. Both the encoder pre-training and the whole-network pre-training can improve the performance of RNN-T model. Due to the very large resource requirement and computation cost, only the CE-based encoder pre-training method is evaluated, which provided the best accuracy in preceding testing on the Cortana data. All the results are evaluated with beam search, and the beam width is 5.

Besides the techniques discloses herein, a widely used training strategy is also evaluated that used a well-trained CTC model to initialize the encoder and a well-trained RNNLM to initialize the prediction network. This CTC+RNNLM initialization approach improved the average WER from 12.63 to 12.29 in 13 test scenarios with 1.8 M words. In contrast, the techniques disclosed herein which pretrains the encoder with alignments using the CE loss outperforms the other methods significantly, achieving 11.34 average WER. Compared with training from the random initialization, the techniques disclosed herein can obtain 10% relative WER reduction in such a large-scale task.

Figure 11:
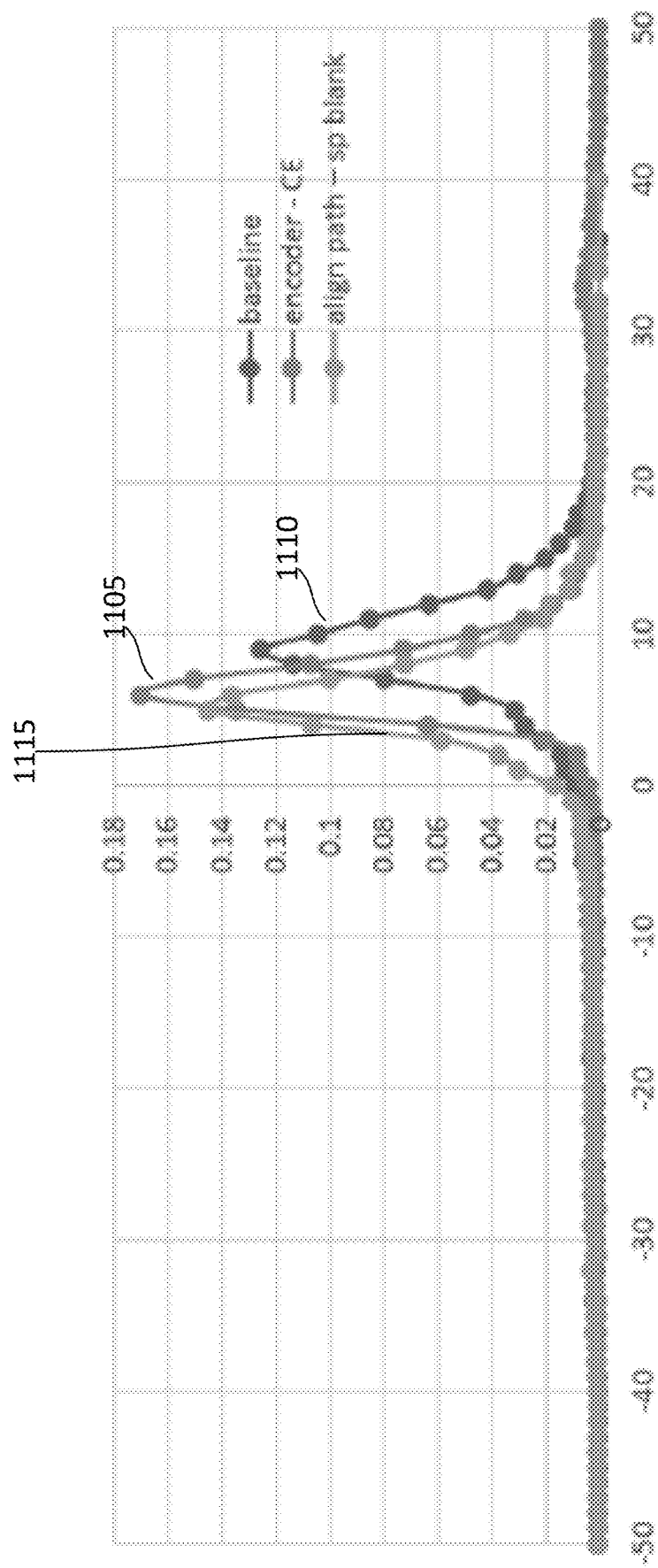
FIG. 11 is a graph that shows frame delay differences between ground truth word alignment and word alignment generated from different RNN-T models.

FIG. 11 is a graph 1100 that shows frame delay differences between ground truth word alignment and word alignment generated from different RNN-T models. Although RNN-T is a natural streaming model, it still has latency compared to hybrid models. The techniques disclosed herein may reduce the latency of RNN-T through alignments for model initialization. To better understand the advantages of the pre-training methods disclosed herein, the gap between the ground truth word alignment and the word alignment generated by greedy decoding from different RNN-T models is compared in graph 1100. The visualization is performed on the test set of Cortana data. As shown in the graph 1100, the central axis represents the ground truth word alignment. The output alignment distributions are normalized to the normal distribution. The horizontal axis represents the number of frames away from the ground truth word alignment, and the vertical axis represents the ratio of words.

As can be seen in FIG. 11, different RNN-T models have different time delay compared with the ground truth. That's because the RNN-T model tends to see several future frames, which can provide more information for the token recognition. The baseline RNN-T model 1110 has around 10 frames average delay. In contrast, when performed the proposed pre-training methods, the average delay can be significantly reduced. Using CE pre-trained encoder 1105 to initialize the RNN-T model can reduce the average delay to 6 frames, and using whole-network pre-training method 1115 can reduce it to 5 frames. The reason for the time delay reduction is that pre-training provides the alignment information to the RNN-T model, which will guide the model to make decision earlier. This shows the advantage of the pre-training techniques disclosed herein in terms of time delay during the decoding stage.

Figure 12:
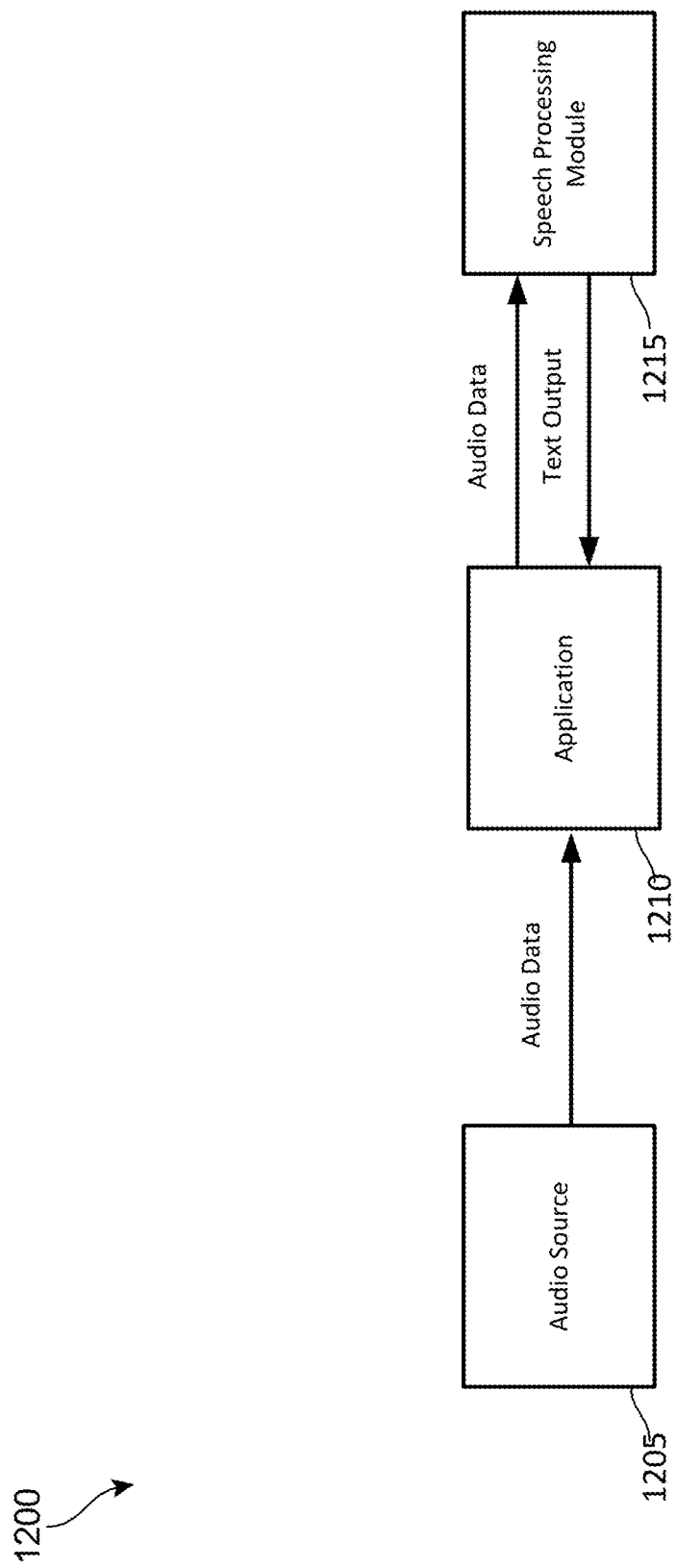
FIG. 12 is a block diagram showing an example computing environment.

FIG. 12 is a block diagram showing an example implementation of components of a computing environment 1200 on which the techniques of the instant application may be implemented. The computing environment 1200 may use an RNN-T pretrained using the techniques in the preceding examples to transcribe audio content into a textual output. The computing environment includes an audio source 1205, an application 1210, and a speech processing module 1215. The elements of the computing environment may be implemented on a computing device and/or at least in part by cloud-based services as discussed with respect to FIG. 13.

The audio source 1205 may include a local source of audio content of a computing device upon which the computing environment 1200 is implemented. The audio source 1205 may include a remote source of audio data that provides the audio content to the computing device via network connection (not shown). The audio source 1205 may be a microphone or an array of microphones that are configured to capture spoken audio content for an application 1210 to be processed into text. The spoken audio content may include spoken commands to be executed by the application 120 or dictated audio content to be converted to text for processing by the application 1210. The audio content may include audio content associated with an online communications session between two or more parties, such as an online communications session via Microsoft Teams, Zoom, or other communications platform that facilitates online audio and/or video communications. The spoken audio content may be received as streaming media content, which may include audio and/or video components. The audio content may also include audio and/or video content files that are stored locally on the computing device 1210. The audio content may be provided to an application 1210 for processing.

The application 1210 may be a native application that is implemented on a computing device or may be cloud-based application that may be accessed, for example, from a web browser of the computing device. The application 1210 may be various types of application. The application 1210 may be, but is not limited to a word processing application, an email application, a spreadsheet application, a social media application, a messaging application, a presentation application, or other type of application that may be configured to receive voice inputs that may include textual input, commands, or both. The user may dictate spoken content to be converted to text for processing by the application and/or to issue commands to the application or to the operation system or other components of the computing device. The application 1210 may be an online communications platform, such as Microsoft Teams, which may be configured to record audio and/or video media streams of a communication session and to generate a written transcript of the communications session. In some implementations, the written transcript may be generated substantially in real time by processing streaming audio content associated with the communications session as such content is received from computing devices of participants of the communication session. The application may be a streaming media content player which may be configured to generate closed caption information for streaming media content. The application may be a component of the operating system of the computing device in some implementations.

The application 1210 may receive the audio data and provide the audio data to a speech processing module 1215. The speech processing module 1215 may be configured to perform automatic speech recognition (ASR) on the audio data to output textual content representing spoken content included in the audio data. The speech processing module 1215 may be configured to process the audio data using an RNN-T that has been trained according to the techniques described in the preceding examples. The speech processing module 1215 may be configured to preprocess the audio data to convert the audio data to a format that may be processed by the RNN-T. The text output of the speech processing module 1215 may be provided to the application for further processing 1210. For example, the text output may include a transcript that may be associated with then online communication session, one or more commands to be executed by the application 1210 where such voice controls are available, textual content to be added to a document, textual content of an email or text message, or other text-based content. The application 1210 may render the text content on a user interface of the computing device. The processing of the audio data may be in substantially real time, and the text output of the speech processing module 1215 may be generated in substantially real time.

In some implementations, the functionality of the speech processing module 1215 may be integrated into the application 1210. In other implementations, the functionality of the processing module 1215 may be provided by a cloud-bases service, as will be discussed further with respect to FIG. 13.

Figure 13:
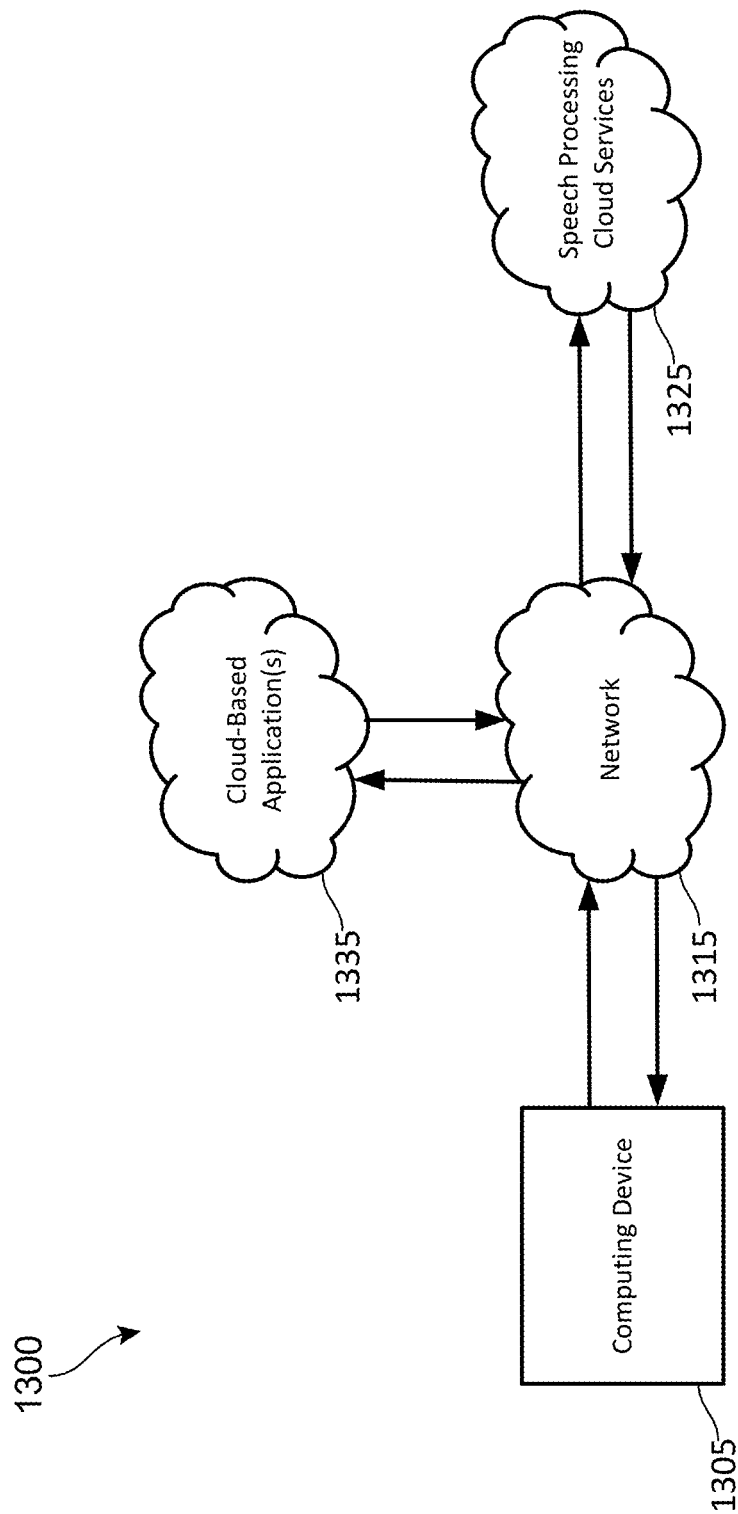
FIG. 13 is a block diagram showing an example computing environment.

FIG. 13 is a block diagram showing an example computing environment 1300 in which techniques disclosed herein may be implemented. The example computing environment 1300 may utilize one or more RNN-T that have been pretrained according to the techniques in the preceding examples to generate text from audio data that includes spoken content. The computing environment 1300 may implement, at least in part, the elements of the computing environment 1200 illustrated in FIG. 12.

The computing device 1305 may be various types of computing devices, such as but not limited to a personal computer (PC), a tablet computer, a laptop computer, a netbook, a gaming and/or entertainment system, a smart phone, a mobile device, or a wearable device. The computing device 1305 may be a server.

The computing device 1305 may implement one or more components of the computing environment 1200 shown in FIG. 12, such as the application 1210. In other implementations, the application 1210 may be a cloud-based application 1335 accessible via a network 1315. The computing device 1305 may access the cloud-based application 1335 via a web browser or other application on the computing device 1305. Furthermore, the speech processing module 1215 may be implemented by the speech processing cloud services 1325. The speech processing cloud services 1325 may provide an interface for sending audio data comprising spoken content to speech processing cloud services 1325 for processing. The speech processing cloud services 1325 may generate a text transcript of the spoken content included in the audio data and send the transcript to the cloud-based application 1335 and/or the computing device 1305 depending upon the implementation.

Figure 14:
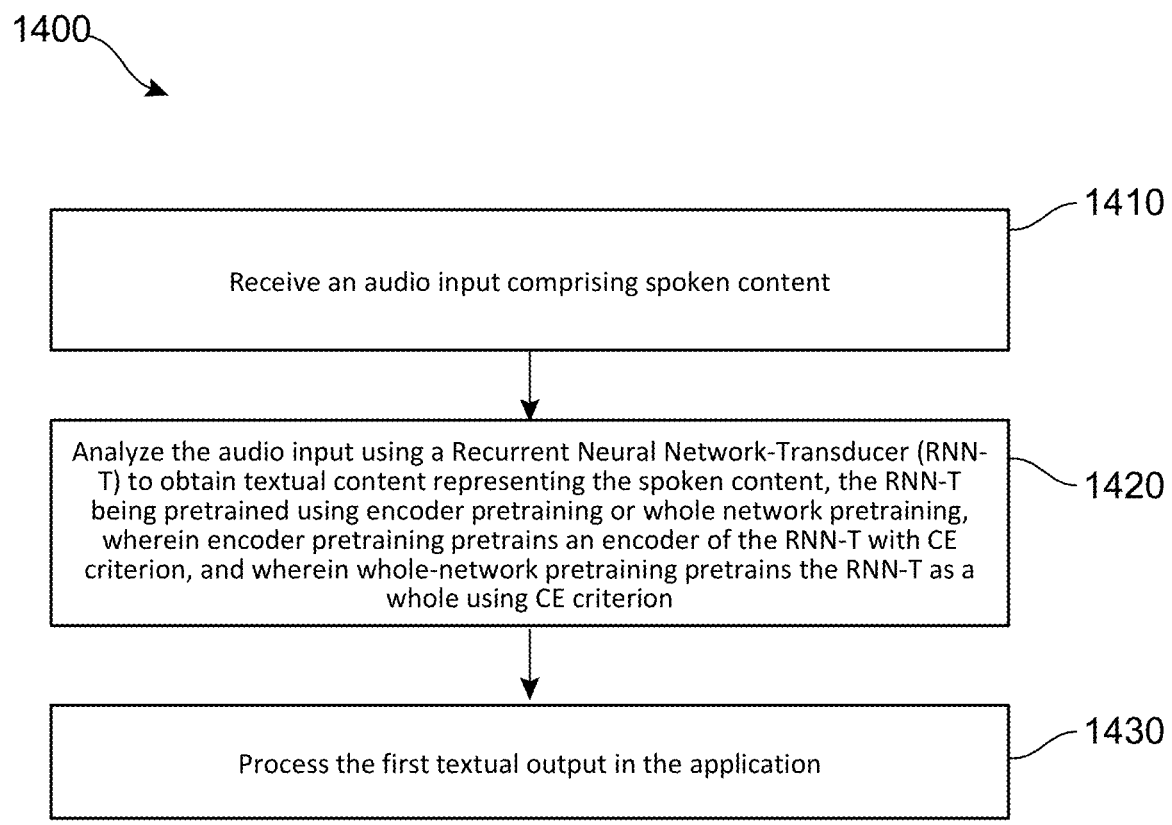
FIG. 14 is a flow diagram of an example process for analyzing audio content using an RNN-T that has been pretrained using encoder pretraining, whole-network pretraining, or both.

FIG. 14 is a flow diagram of an example process 1400 for analyzing audio content using an RNN-T that has been pretrained according to the techniques disclosed in the instant application to generate a text output. The process 1400 may be implemented by the computing environment 1200 illustrated in FIG. 12 and/or by the computing device 1305 of FIG. 13.

The process 1400 may include the operation 1410 of receiving an audio input comprising spoken content. As discussed above with respect to FIG. 12, the audio input may be captured by a microphone of the computing device 1305, may be streaming content associated with the a communication session or with other audiovisual data that includes spoken content, or may be accessed from a file stored locally in a memory of the computing device 1305 or obtained from an external source. In some implementations, the application 1210 may receive the audio input and provide the audio input to the RNN-T in operation 1420.

The process 1400 may include an operation 1420 of analyzing the audio input using a Recurrent Neural Network-Transducer (RNN-T) to obtain textual content representing the spoken content where the RNN-T is pretrained using encoder pretraining or whole network pretraining. The encoder pretraining pretrains an encoder of the RNN-T with CE criterion and the whole-network pretraining pretrains the RNN-T as whole using CE criterion, where the CE criterion represent a divergence between expected outputs and reference outputs of a model. The RNN-T may be trained using the encoder pretraining and/or the whole network pretraining technique disclosed in the preceding examples. These pretraining techniques may significantly improve the WER of the RNN-T providing more accurate ASR. The improved ASR may provide a significantly better user experience due to the increased accuracy of the speech recognition by improving the accuracy of voice command recognition, improving dictation and transcription services, and other services that rely on accurate ASR.

The process 1400 may include the operation 1430 of processing the first textual output in with an application on the data processing system. As discussed with respect to FIG. 12, the application 1210 may be, but is not limited to a word processing application, an email application, a spreadsheet application, a social media application, a messaging application, a presentation application, or other type of application that may be configured to receive voice inputs that may include textual input, commands, or both. The text output from the RNN-T may be translated into commands to be performed by the application. The text output from the RNN-T may include text to be rendered in a document, email, message, etc. that the user may be editing via the application 1210.

The detailed examples of systems, devices, and techniques described in connection with FIGS. 1-5 and 8-14, are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5 and 8-14 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules may provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
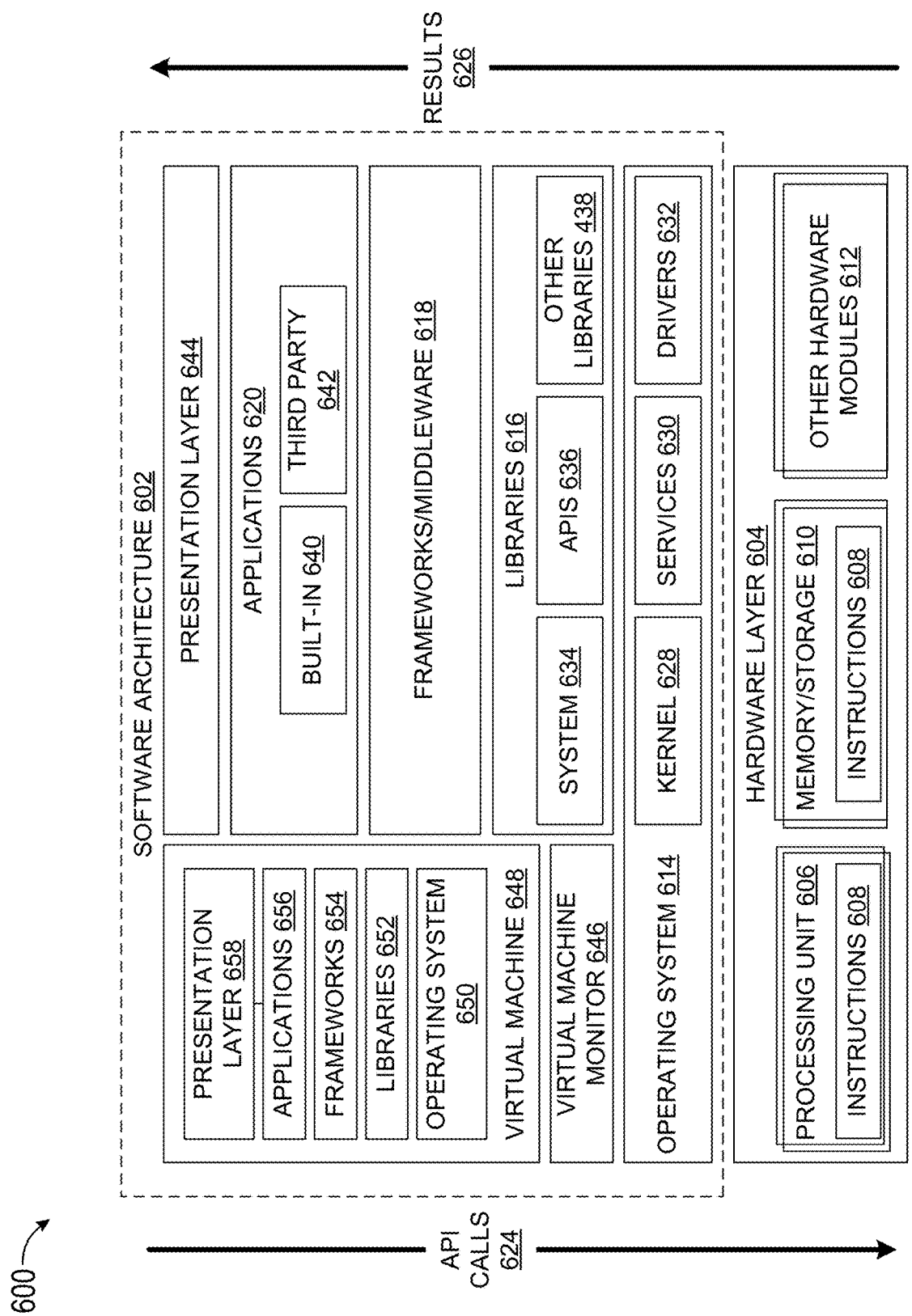
FIG. 6 is a block diagram showing an example software architecture, various portions of which may be used in conjunction with various hardware architectures herein described, which may implement any of the features herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 614, libraries 672, frameworks 654, applications 656, and/or a presentation layer 658.

Figure 7:
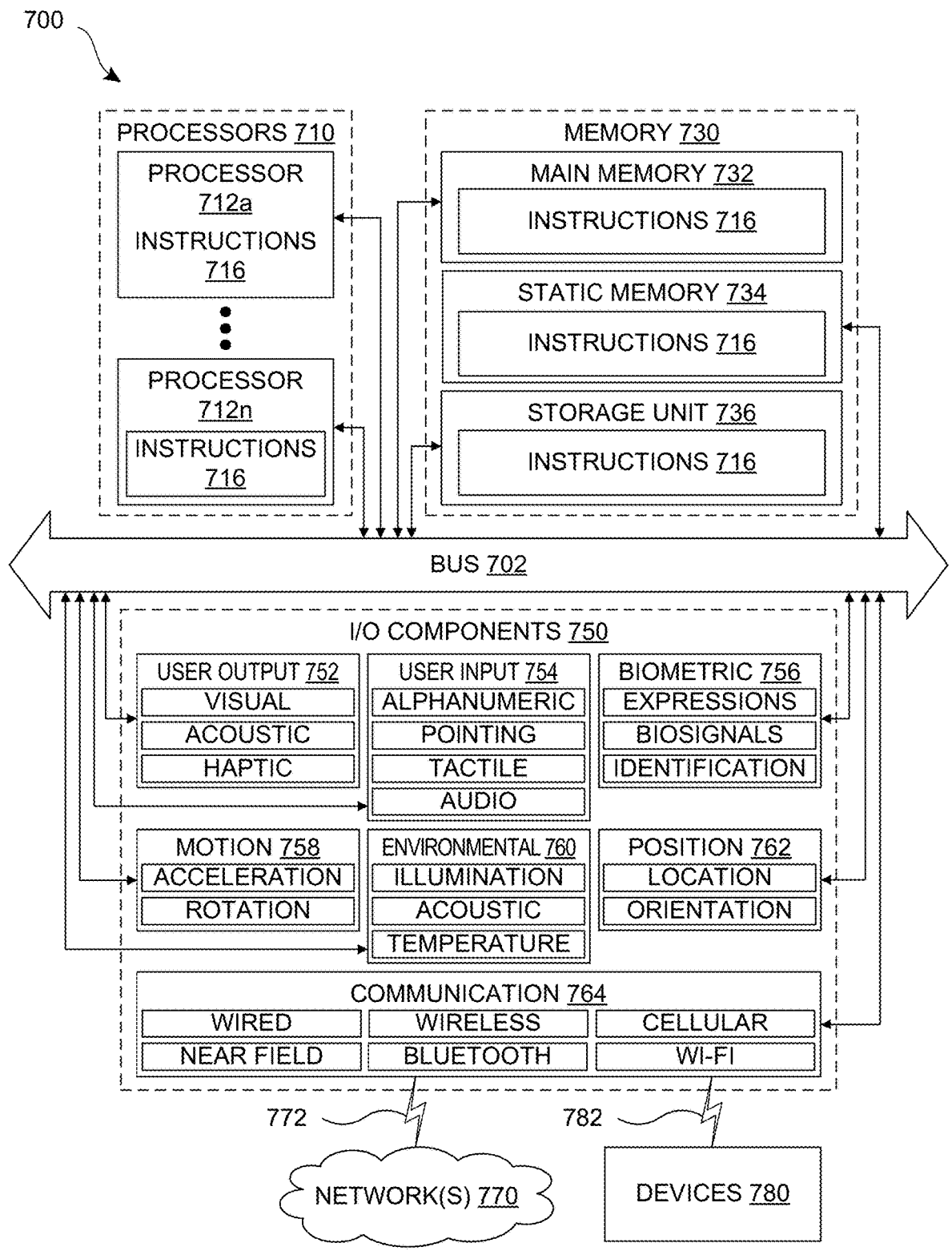
FIG. 7 is a block diagram showing components of an example machine configured to read instructions from a machine-readable medium and perform any of the features described herein.

FIG. 7 is a block diagram showing components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
 a processor; and
 a computer-readable medium storing executable instructions for causing the processor to perform operations of:
  receiving an audio input comprising spoken content;
  analyzing the audio input using a Recurrent Neural Network-Transducer (RNN-T) to obtain a first textual output representing the spoken content, the RNN-T being pretrained using whole network pretraining, wherein the whole-network pretraining pretrains the RNN-T as whole using a cross-entropy (CE) criterion by pretraining an encoder of the RNN-T using a two-dimensional label matrix for each utterance included in training data to train an encoder of the RNN-T and by pretraining a prediction network of the RNN-T using a three-dimensional label matrix derived from the two-dimensional label matrix, wherein the CE criterion represents a divergence between expected outputs and reference outputs of a model; and
  processing the first textual output with an application on the data processing system.

2. The data processing system of claim 1, wherein for the encoder pretraining, the encoder is trained using the CE criterion from a neural network-based token classification model, and the neural network-based token classification model is trained using first token-aligned training data representing a plurality of utterances, wherein each utterance is associated with a plurality of frames of audio data, and wherein tokens representing each utterance are aligned with frame boundaries of the plurality of frames of audio data.

3. A data processing system comprising:
 a processor; and
 a computer-readable medium storing executable instructions for causing the processor to perform operations of:
  training a neural network-based token classification model using first token-aligned training data representing a plurality of utterances, wherein each utterance is associated with a plurality of frames of audio data, and wherein tokens representing each utterance are aligned with frame boundaries of the plurality of frames of audio data;
  obtaining a first cross-entropy (CE) criterion from the neural network-based token classification model, wherein the CE criterion represents a divergence between expected outputs and reference outputs of the model;

pretraining an encoder of an RNN-Transducer (RNN-T) based on the first CE criterion obtained from the neural network-based token classification model using a two-dimensional label matrix for each utterance included in the training data;

determining a three-dimensional label matrix for each respective utterance from the two-dimensional label matrix for the respective utterance, the three-dimensional label matrix comprising an alignment path that represents a series of tokens of the respective utterance over a series of frames of audio data;

pretraining a prediction network of the RNN-T based on the CE criterion obtained from the neural network-based token classification model using the three-dimensional label matrix; and training the RNN-T with second training data after pretraining the encoder of the RNN-T.

4. The data processing system of claim 3, wherein the computer-readable medium further stores executable instructions for causing the processor to perform a function of generating the token-aligned training data from a source training data set by:

accessing a source training data element representing an utterance of a word;

dividing the word into a plurality of tokens;

determining a number of frames of audio data comprising the utterance of the word;

adding the source training data element to the token-aligned training data responsive to the number of frames comprising the utterance exceeding or matching a number of tokens comprising the plurality of tokens.

5. The data processing system of claim 4, wherein the computer-readable medium further stores executable instructions for causing the processor to perform a function of discarding the source training data element responsive to the number of tokens exceeding the number of frames comprising the utterance.

6. The data processing system of claim 4, wherein to train the RNN-T with second training data, the computer-readable medium further stores executable instructions for causing the processor to perform a function of processing an output of the encoder of the RNN-T with an additional fully-connected layer to add alignment information to a high level representation of each frame of acoustic data.

7. The data processing system of claim 3, wherein the computer-readable medium further stores executable instructions for causing the processor to perform a function of pretraining the prediction network of the RNN-T based on the CE criterion obtained from the neural network-based token classification model.

8. The data processing system of claim 3, wherein determining the three-dimensional label matrix further comprises:

identifying a space in the alignment path representing a pause in the utterance; and setting a blank token in the alignment path at a location of the space.

9. The data processing system of claim 8, wherein the computer-readable medium further stores executable instructions for causing the processor to perform a function of optimizing a CE loss between the three-dimensional label matrix and an output of the model.

10. A data processing system comprising:
a processor; and
a computer-readable medium storing executable instructions for causing the processor to perform operations of:

training a neural network-based token classification model using first token-aligned training data representing a plurality of utterances, wherein each utterance is associated with a plurality of frames of audio data, and wherein tokens representing each utterance are aligned with frame boundaries of the plurality of frames of audio data;

obtaining a first cross-entropy (CE) criterion from the neural network-based token classification model, wherein the CE criterion represents a divergence between expected outputs and reference outputs of the model;

pretraining an encoder of an RNN-Transducer (RNN-T) based on the first CE criterion obtained from the neural network-based token classification model; and training the RNN-T with second training data after pretraining the encoder of the RNN-T, wherein training the RNN-T with the second training data includes:

processing an output of the encoder of the RNN-T with an additional fully-connected layer to add alignment information to a high level representation of each frame of acoustic data, wherein the output of the fully-connected layer is calculated by:

$$L_{enc} = \sum_{k=1}^{K} y_{t,k} * \log(softmax(f^{fc}(h_{t,k}^{enc})))$$

where $f^{fc}$ represents a fully-connected layer, k is a label index and K denotes a largest dimension of an output of a joint network of the RNN-T, and $y_t$ is a word piece label for each input frame $x_t$.

11. A method performed by a data processing system for training a Recurrent Neural Network-Transducer (RNN-T), the method comprising:

training a neural network-based token classification model using first token-aligned training data representing a plurality of utterances, wherein each utterance is associated with a plurality of frames of audio data, and wherein tokens representing each utterance are aligned with frame boundaries of the plurality of frames of audio data;

obtaining a first cross-entropy (CE) criterion from the neural network-based token classification model, wherein the CE criterion represents a divergence between expected outputs and reference outputs of the model;

pretraining an encoder of an RNN-Transducer (RNN-T) based on the first CE criterion obtained from the neural network-based token classification model using a two-dimensional label matrix for each utterance included in the training data;

determining a three-dimensional label matrix for each respective utterance from the two-dimensional label matrix for the respective utterance, the three-dimensional label matrix comprising an alignment path that represents a series of tokens of the respective utterance over a series of frames of audio data;

pretraining a prediction network of the RNN-T based on the CE criterion obtained from the neural network-based token classification model using the three-dimensional label matrix; and training the RNN-T with second training data after pretraining the encoder of the RNN-T.

12. The method of claim 11, further comprising generating the token-aligned training data from a source training data set by:
   accessing a source training data element representing an utterance of a word;
   dividing the word into a plurality of tokens;
   determining a number of frames of audio data comprising the utterance of the word;
   adding the source training data element to the token-aligned training data responsive to the number of frames comprising the utterance exceeding or matching a number of tokens comprising the plurality of tokens.

13. The method of claim 12, further comprising:
   discarding the source training data element responsive to the number of tokens exceeding the number of frames comprising the utterance.

14. The method of claim 12, wherein training the RNN-T with second training data further comprises:
   processing an output of the encoder of the RNN-T with an additional fully-connected layer to add alignment information to a high level representation of each frame of acoustic data.

15. The method of claim 11, further comprising:
   pretraining the prediction network of the RNN-T based on the CE criterion obtained from the neural network-based token classification model.

16. The method of claim 11, wherein determining the three-dimensional label matrix further comprises:
   identifying a space in the alignment path representing a pause in the utterance;
   setting a blank token in the alignment path at a location of the space; and
   optimizing a CE loss between the three-dimensional label matrix and an output of the model.

17. A method performed by a data processing system for training a Recurrent Neural Network-Transducer (RNN-T), the method comprising:
   training a neural network-based token classification model using first token-aligned training data representing a plurality of utterances, wherein each utterance is associated with a plurality of frames of audio data, and wherein tokens representing each utterance are aligned with frame boundaries of the plurality of frames of audio data;
   obtaining a first cross-entropy (CE) criterion from the neural network-based token classification model, wherein the CE criterion represents a divergence between expected outputs and reference outputs of the model;
   pretraining an encoder of an RNN-Transducer (RNN-T) based on the first CE criterion obtained from the neural network-based token classification model; and
   training the RNN-T with second training data after pretraining the encoder of the RNN-T, wherein training the RNN-T with the second training data includes:
      processing an output of the encoder of the RNN-T with an additional fully-connected layer to add alignment information to a high level representation of each frame of acoustic data, wherein the output of the fully-connected layer is calculated by:

$$L_{enc} = \sum_{k=1}^{K} y_{t,k} * \log(softmax(f^{fc}(h_{t,k}^{enc})))$$

Where $f^{fc}$ represents a fully connected layer, k is a label index and K denotes a largest dimension of an output of a joint network of the RNN-T, and $y_t$ is a word piece label for each input frame $x_t$.

* * * * *